US006993294B2

(12) United States Patent
Nobukiyo et al.

(10) Patent No.: US 6,993,294 B2
(45) Date of Patent: Jan. 31, 2006

(54) MOBILE COMMUNICATION SYSTEM, COMMUNICATION CONTROL METHOD, BASE STATION AND MOBILE STATION TO BE USED IN THE SAME

(75) Inventors: Takahiro Nobukiyo, Tokyo (JP); Toshifumi Sato, Tokyo (JP); Motoya Iwasaki, Tokyo (JP); Takashi Mochizuki, Tokyo (JP); Naoto Ishii, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 305 days.

(21) Appl. No.: 10/271,722

(22) Filed: Oct. 17, 2002

(65) Prior Publication Data

US 2003/0073409 A1    Apr. 17, 2003

(30) Foreign Application Priority Data

Oct. 17, 2001    (JP)    ............................. 2001-318793

(51) Int. Cl.
    *H04B 17/00*    (2006.01)
(52) U.S. Cl. .................. 455/67.11; 455/423; 455/502; 370/329; 370/342
(58) Field of Classification Search ................ 455/522, 455/226.1, 67.1, 502, 67.11, 423; 370/252, 370/335, 441, 342, 329, 468
    See application file for complete search history.

(56) References Cited

U.S. PATENT DOCUMENTS 6,044,072 A * 3/2000 Ueda .......................... 370/335
6,104,933 A * 8/2000 Frodigh et al. ............. 455/522
6,122,265 A * 9/2000 Nakamura et al. .......... 370/332
6,167,031 A * 12/2000 Olofsson et al. ............ 370/252
6,456,598 B1 * 9/2002 Le Strat et al. ............. 370/252
2003/0174662 A1 * 9/2003 Malkamaki ................. 370/310

FOREIGN PATENT DOCUMENTS

| CN | 1371579 A | 9/2002 |
| JP | 2001-128218 | 5/2001 |
| KR | 2001-15203 | 2/2001 |
| WO | WO 00/62456 | 10/2000 |

OTHER PUBLICATIONS

3GPP TSG RAN WG1 "Power control Issues for Gated DPCCH", Philips, May 22-25, 2000, Tokyo, Japan.
"Procedure of Gated DPCCH transmission associated with DSCH" TSG-RAN Working Group, Jul. 1, 2000, XP002223691.

* cited by examiner

*Primary Examiner*—Tilahun Gesesse
(74) *Attorney, Agent, or Firm*—Young & Thompson

(57) ABSTRACT

A HSDPA type mobile communication system includes a base station and a mobile station. The base station sets the uplink control channel with the mobile station to transmit a pilot signal. The mobile station measures a reception quality of the pilot signal to transmit the quality information to the base station using the uplink quality control channel. The base station performs transmission control of data for the mobile station using the quality information. The mobile station is set to perform control of starting and stopping transmission of the quality information so that the quality information is transmitted only as required. Therefore, power consumption in the mobile station can be reduced, interference wave power in the uplink can be reduced, and capacity of the uplink can be increased.

30 Claims, 30 Drawing Sheets

MOBILE COMMUNICATION SYSTEM, COMMUNICATION CONTROL METHOD, BASE STATION AND MOBILE STATION TO BE USED IN THE SAME

BACKGROUND OF THE INVENTION

1. Field of the Invention

The present invention relates generally to a mobile communication system, a communication control method, a base station and a mobile station to be used in the same. More particularly, the invention relates to a mobile communication system, a communication control method, a base station and a mobile station to be used in the same suitable for use in High Speed Downlink Packet Access (HSDPA) system for high speed data transmission in downlink from the base station to the mobile station.

2. Description of the Related Art

Study has been made for a high speed downlink packet access (HSDPA) system of this kind in Third Generation Partnership Project (3GPP). In the HSDPA system, a High Speed-Physical Downlink Shared Channel (HS-PDSCH) is used for downlink (DL) transmission from the base station to the mobile station. The HS-PDSCH is adapted for data transmission. One HS-PDSCH is shared by a plurality of mobile stations by sharing in time (time sharing).

In the HSDPA system, for controlling data transmission from the base station to the mobile station, an uplink Dedicated Physical Control Channel (DPCH) and an uplink High Speed-Dedicated Physical Control Channel (HS-DPCCH) are set between the base station and a plurality of mobile stations, respectively. The uplink (UL) DPCH is used for transmitting a control information, such as data transmission timing information and so forth from the mobile station to the base station On the other hand, UL HS-DPCCH is used for transmission of Acknowledge/Negative Acknowledge (ACK/NACK) information of Hybrid-Automatic Repeat request (HARQ) (meaning of which will be discussed later) and quality information to the base station by the mobile station.

Here, quality means a quality (Ec/Io: [energy per chip/interference wave power per unit frequency]) of a Common Pilot Channel (CPICH) signal.

However, in the conventional such HSDPA system, in order to continue setting of UL DPCH and UL HS-DPCCH after initiation of setting of the HS-PDSCH, a large number of mobile stations which are unnecessary to transmit quality information, namely a large number of mobile station not performing packet reception set HS-DPCCH to make UL interference power significant. Furthermore, a capacity of uplink radio channel is significantly limited.

Furthermore, since the mobile station continuously transmit the quality information, power consumption becomes significant to shorten operation period of a battery. Also, since the base station performs transmission of the quality information at a predetermined timing and a predetermined interval, the base station cannot receive the quality information at the timing transmitting data to the mobile station.

SUMMARY OF THE INVENTION

It is an object of the present invention to provide a mobile communication system, a communication control method, a mobile station and a base station to be used in the same, which can reduce power consumption of the mobile station.

Another object of the present invention is to provide a mobile communication system, a communication control method, a mobile station and a base station to be used in the same, which can reduce interference wave power in uplink and whereby increase capacity of uplink.

According to the first aspect of the present invention, mobile communication system comprises:

a base station; and a mobile station, the base station transmitting a downlink signal;

the mobile station setting an uplink control channel with the base station, measuring a reception quality of the downlink signal, transmitting a quality information depending upon the reception quality using the uplink control channel, the base station performing transmission control of data to the mobile station using the quality information, the base station including means for transmitting data transmission notice to the mobile station by setting a downlink control channel with the mobile station, and the mobile station including means for starting transmission of the quality information to the base station at a given interval in response to the data transmission notice while the uplink control channel is set.

According to the second aspect of the present invention, a mobile communication system comprises:

a base station; and a mobile station, the base station transmitting a downlink signal;

the mobile station setting an uplink control channel with the base station, measuring a reception quality of the downlink signal, transmitting a quality information depending upon the reception quality using the uplink control channel, the base station performing transmission control of data to the mobile station using the quality information, the mobile station including means for transmitting the quality information at a given interval in response to reception of data, and means for transmitting a indication information indicating on transmission of the quality information using the uplink control channel.

According to the third aspect of the present invention, a mobile communication system comprises:

a base station; and a mobile station, the base station transmitting a downlink signal;

the mobile station setting an uplink control channel with the base station, measuring a reception quality of the downlink signal, transmitting a quality information depending upon the reception quality using the uplink control channel, the base station performing transmission control of data to the mobile station using the quality information, the base station including means for notifying a threshold value to the mobile station by setting downlink control channel, and the mobile station including means for controlling transmission of the quality information to the base station at a given interval in response to a result of comparison of the threshold value and the reception quality.

According to the fourth aspect of the present invention, a mobile communication system comprises:

a base station; and a mobile station, the base station transmitting a downlink signal;

the mobile station setting an uplink control channel with the base station, measuring a reception quality of the downlink signal, transmitting a quality information depending upon the reception quality using the uplink control channel, the base station performing transmission control of data to the mobile station using the quality information, the base station including means for setting a downlink control channel with the mobile station and transmitting a command information indicative of a demand of reporting of the quality information to the mobile station in response to data transmission to the mobile station, and the mobile station including means for transmitting the quality information to the base station in response to the command information.

According to the fifth aspect of the present invention, a communication control method in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, and the base station performing transmission control of data to the mobile station using the quality information, the communication control method comprises:

in the base station, step of transmitting data transmission notice to the mobile station by setting a downlink control channel with the mobile station, and in the mobile station, step of starting transmission of the quality information to the base station at a given interval in response to the data transmission notice while the uplink control channel is set.

According to the sixth aspect of the present invention, a communication control method in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, and the base station performing transmission control of data to the mobile station using the quality information, the communication control method comprises:

in the mobile station, step of transmitting the quality information at a given interval in response to reception of data, and step of transmitting a indication information indicating on transmission of the quality information using the uplink control channel.

According to the seventh aspect of the present invention, a communication control method in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, and the base station performing transmission control of data to the mobile station using the quality information, the communication control method comprises:

in the base station, step of notifying a threshold value to the mobile station by setting downlink control channel, and in the mobile station, step of controlling transmission of the quality information to the base station at a given interval in response to a result of comparison of the threshold value and the reception quality.

According to the eighth aspect of the present invention, communication control method in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, and the base station performing transmission control of data to the mobile station using the quality information, the communication control method comprises:

in the base station, step of setting a downlink control channel with the mobile station and transmitting a command information indicative of a demand of reporting of the quality information to the mobile station in response to data transmission to the mobile station, and in the mobile station, step of transmitting the quality information to the base station in response to the command information.

According to the ninth aspect of the present invention, a mobile station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the mobile station comprises:

means for setting a downlink control channel with the base station and receiving a data transmission notice from the base station; and means for starting transmission of the quality information to the base station at a given interval in response to the data transmission notice while the uplink control channel is set.

According to the tenth aspect of the present invention, a mobile station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the mobile station comprises:

means for transmitting the quality information at a given interval in response to reception of data; and means for transmitting a indication information indicating on transmission of the quality information using the uplink control channel.

According to the eleventh aspect of the present invention, a mobile station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the mobile station comprises:

means for setting a downlink control channel with the base station and receiving a threshold value from the base station; and means for controlling transmission of the quality information to the base station at a given interval in response to a result of comparison of the threshold value and the reception quality.

According to the twelfth aspect of the present invention, a mobile station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the mobile station comprises:

means for setting a downlink control channel with the base station and receiving a command information indicative of a demand of reporting of the quality information in response to data transmission; and means for transmitting the quality information to the base station in response to the command information.

According to the thirteenth aspect of the present invention, a base station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the base station comprising:

means for transmitting data transmission notice to the mobile station by setting a downlink control channel with the mobile station, and means for receiving the quality information from the mobile station transmitting the quality information at a given interval in response to the data transmission notice while the uplink control channel is set.

According to the fourteenth aspect of the present invention, a base station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the base station comprising:

means for receiving the quality information at a given interval from the mobile station; and means for receiving a indication information indicating on transmission of the quality information from the mobile station using the uplink control channel.

According to the fifteenth aspect of the present invention, a base station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the base station comprising:

means for notifying a threshold value to the mobile station by setting downlink control channel; and means for receiving the quality information from the mobile station at a given interval in response to a result of comparison of the threshold value and the reception quality.

According to the sixteenth aspect of the present invention, a base station in a mobile communication system including a base station and a mobile station, the base station transmitting a downlink signal, the mobile station setting an uplink control channel with the base station, measuring a reception quality of the downlink signal, transmitting a quality information depending upon the reception quality using the uplink control channel, the base station performing transmission control of data to the mobile station using the quality information, the base station comprises:

means for setting a downlink control channel with the mobile station and transmitting a command information indicative of a demand of reporting of the quality information to the mobile station in response to data transmission to the mobile station; and means for receiving the quality information from the mobile station.

In the operation, in a HSDPA type mobile communication system, in which the base station sets the uplink control channel with the mobile station to transmit a pilot signal, the mobile station measures a reception quality of the pilot signal to transmit the quality information to the base station using the uplink quality control channel, and the base station performs transmission control of data for the mobile station using the quality information, the mobile station performs control of starting and stopping transmission of the quality information when the uplink HS-DPCCH is setting. Namely, transmission control of transmission of the quality information from the mobile station to the base station only is performed so that the quality information is transmitted only as required. Therefore, power consumption in the mobile station can be reduced, interference wave power in the uplink can be reduced, and capacity of the uplink can be increased.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiments of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
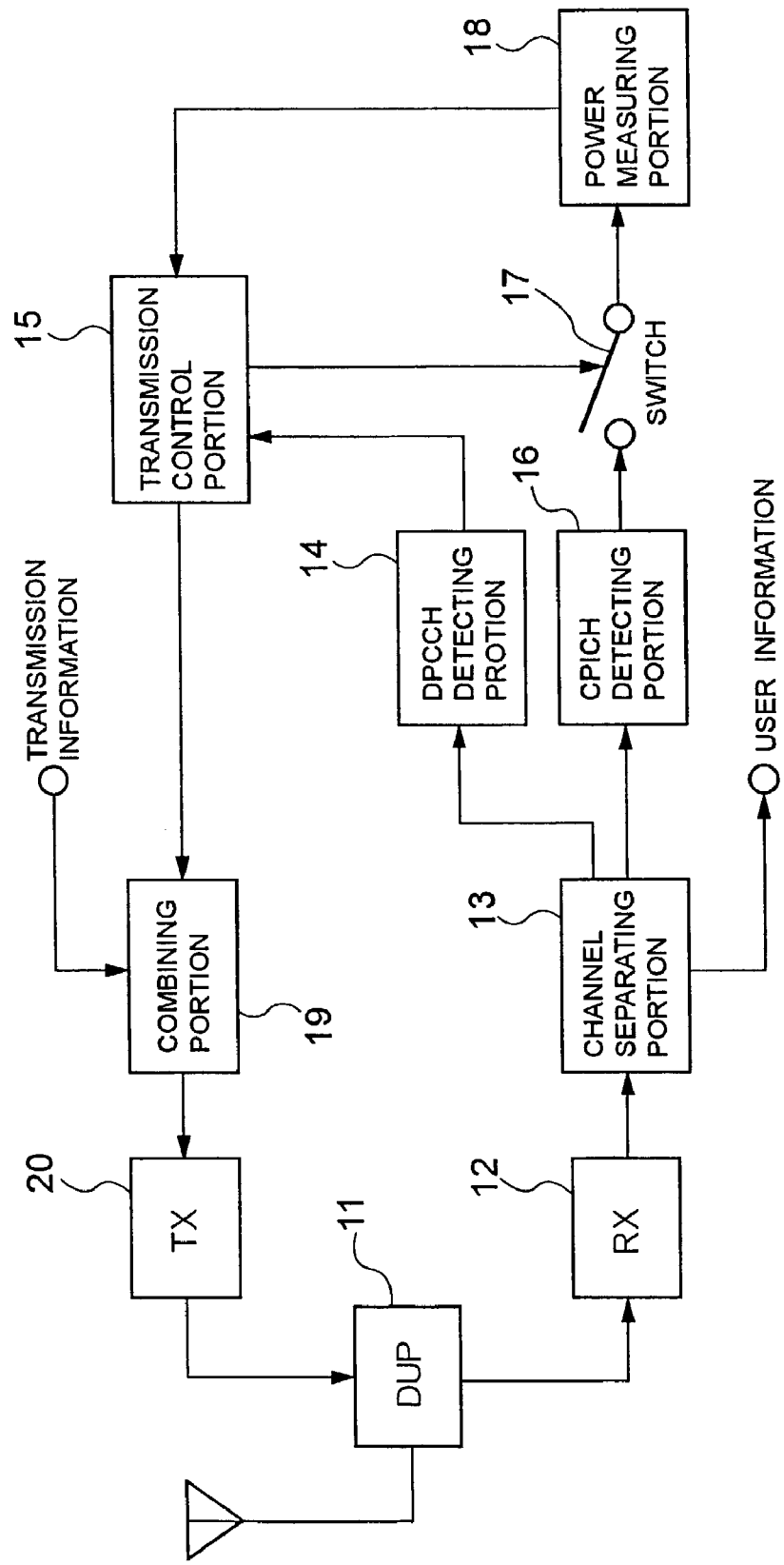
FIG. 1 is a block diagram showing the preferred embodiment of a mobile station according to the present invention.
Figure 2:
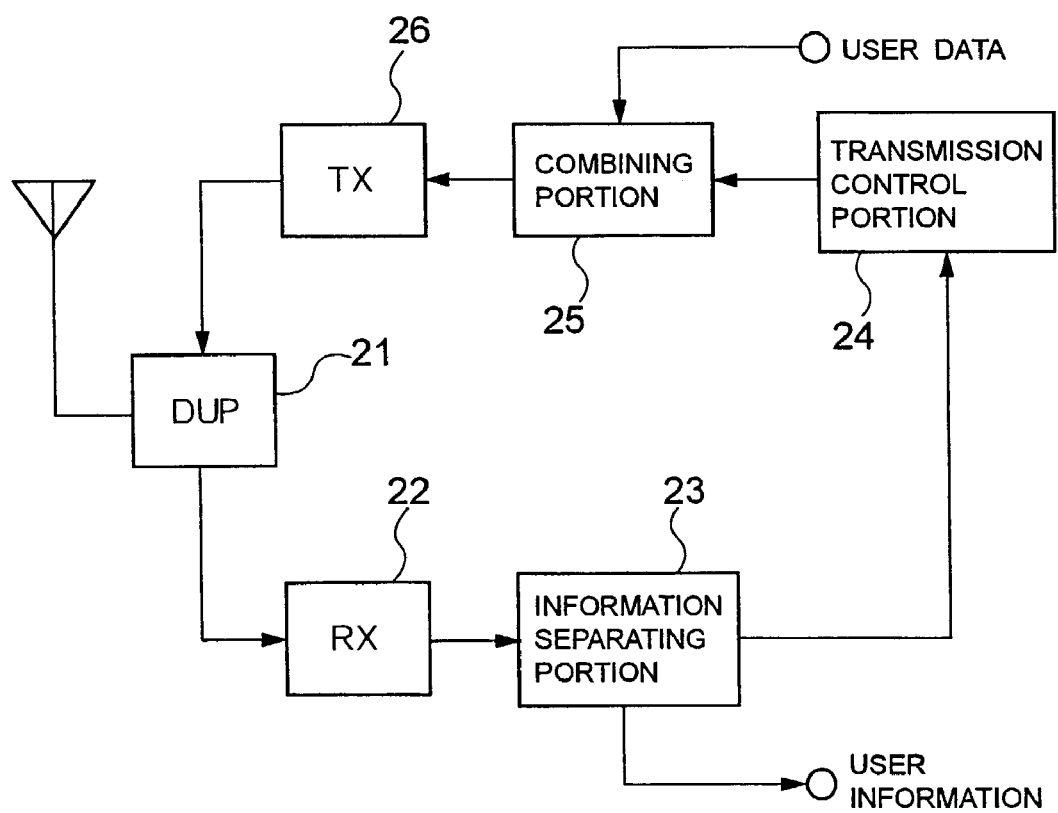
FIG. 2 is a block diagram showing the preferred embodiment of a base station according to the present invention.

FIG. 1 is a block diagram showing one embodiment of a basic construction of a mobile station according to the present invention, and FIG. 2 is a block diagram showing one embodiment of a base station according to the present invention.

Referring to FIG. 1, a received wave from an antenna is supplied to a receiving portion 12 via a duplexer (DUP) 11 and is demodulated therein. A demodulated output is separated into a user information and a control information by a channel separator 13. Among the control information, downlink (DL) dedicated physical control channel (DPCH) or DPCCH is detected by a DPCCH detecting portion 14 and is then supplied to a transmission control portion 15. The transmission control portion 15 makes analysis of DL DPCCH. When it is necessary to transmit the quality information to the base station, a switch 17 is turned ON to supply a result of detection in a Common Pilot Channel (CPICH) detecting portion 16 to a power measuring portion 18.

On the other hand, when the transmission control portion 15 makes analysis of DL DPCCH and thus makes judgment that transmission of the control information, such as quality information or the like to the base station is not necessary, the uplink is released. CPICH is detected by the CPICH detecting portion 16. When the switch 17 is ON, measurement of a received power is performed by a power measuring portion 18. The result of measurement is supplied to the transmission control portion 15. In the transmission control portion 15, the control information, such as quality information or the like to be transmitted to the base station is generated to supply to a combining portion 19. The combining portion 19 then generates a transmission information.

Here, the quality information means reception quality (Ec/Io: [energy per chip/interference wave power per unit frequency]). The transmission information is transmitted to the base station via DUP 11 by being supplied to the transmitting portion 20 and modulated therein.

Referring to FIG. 2, a reception wave from the antenna is input to a receiving portion 22 via a duplexer (DUP) 21 and is processed for demodulation and so forth. Then, the processed reception wave is supplied to a received information separating portion 23. In the received information separating portion 23, a user information and various control information are separated. The control information is output to a transmission control portion 24. In the transmission control portion 24, a user data of the mobile station, in which a transmission power is determined on the basis of the quality information as the control information supplied from the information separating portion 23, and control information to be notified to the mobile station, are generated to be supplied to a combining portion 25. In the combining portion 25, a transmission information is generated. The transmission information is supplied to the transmitting portion 26 and is processed for modulation and so forth to be transmitted to the mobile station via the DUP 21.

Figure 3:
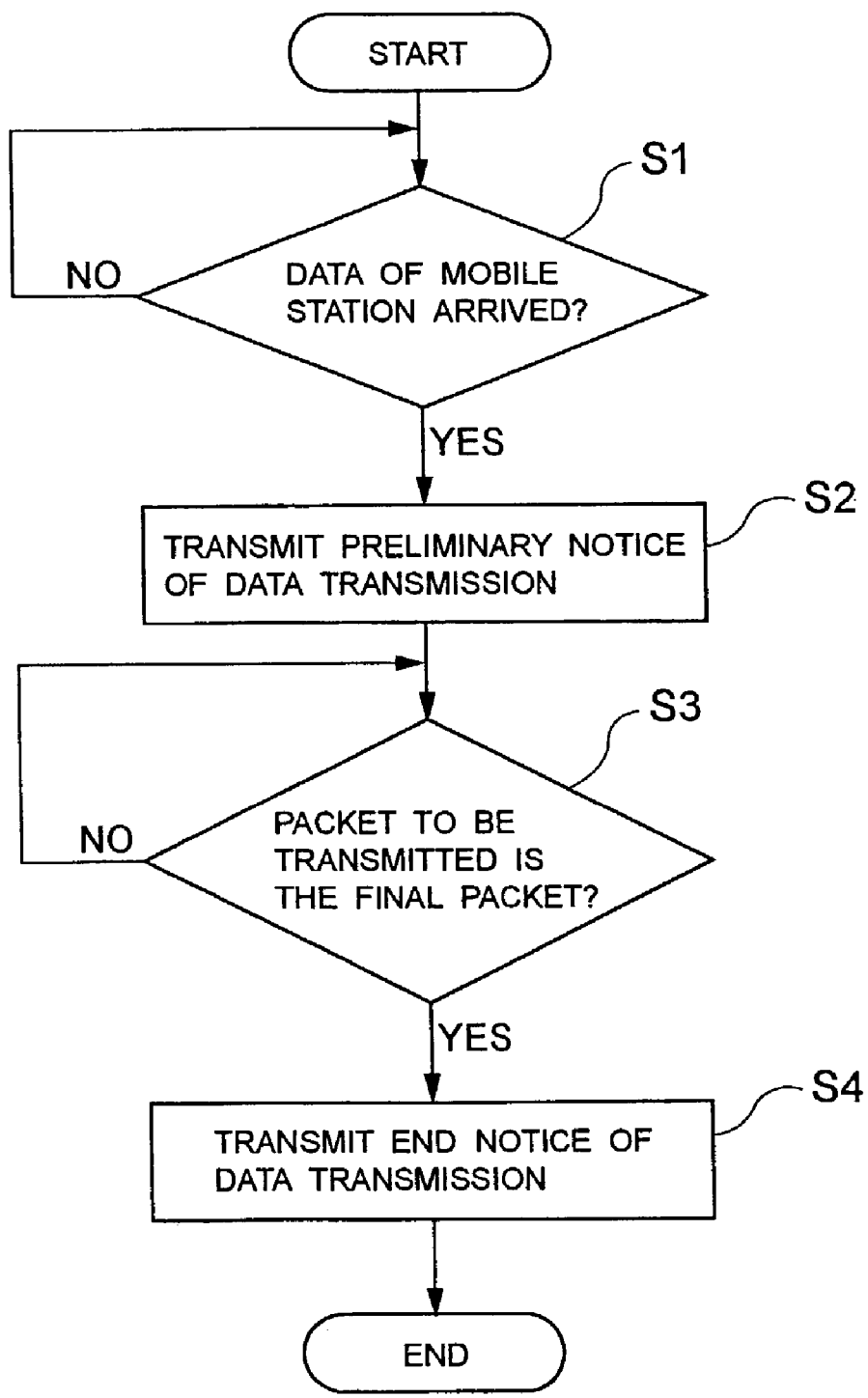
FIG. 3 is a flowchart showing operation of the first embodiment of a base station according to the present invention.
Figure 4:
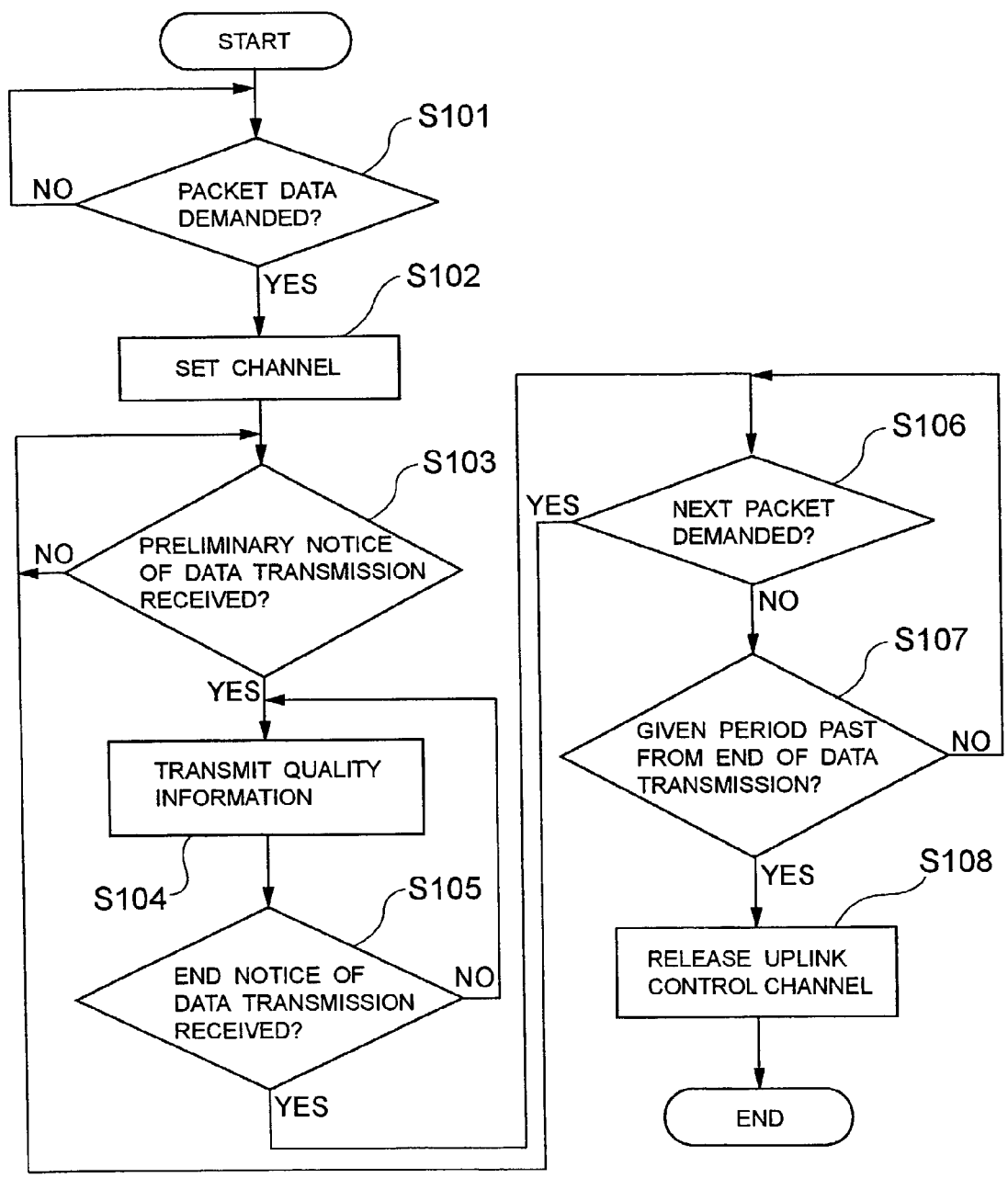
FIG. 4 is a flowchart showing operation of the first embodiment of a mobile station according to the present invention.

Next, operation of the shown embodiment will be discussed hereinafter in detail with reference to FIGS. 3 to 7. FIGS. 3 and 4 are flowcharts showing operation of the first embodiment of the present invention. FIG. 3 is a flowchart showing a processing operation to be performed in the base station, in which processing operation of the base station to perform preliminary notice of data transmission and end notice of data transmission are realized. On the other hand, FIG. 4 is a flowchart showing operation of the mobile station, in which processing operation of the mobile station to perform reporting of quality information for the base station and releasing process for quality control channel are realized.

In the shown embodiment, after receiving the preliminary notice of data transmission transmitted by the base station, the mobile station transmits the quality information and receives the end notice of data transmission. Thereafter, since the mobile station stops transmission of the quality information, battery operation period of the mobile station can be expanded. Furthermore, upon stopping transmission of the quality information, uplink quality control channel is released, only a part of mobile stations among a large number of mobile stations set UL HS-DPCCH to reduce uplink interference power and to increase capacity of the uplink radio channel.

Referring to FIG. 3, the base station makes judgment whether the packet data demanded by the mobile station arrives to own station (S1). When the packet data arrives, a packet schedule of data to be transmitted to the mobile station is checked to perform preliminary notice of data transmission to the mobile station by using downlink dedicated physical control channel (DL DPCH) (S2). Arrival of the packet data to own station means that data demanded by the mobile station are stored in a buffer of the base station from information provider. One example of the information provider is WEB server. Next, upon transmission of the packet data, check is performed whether the packet data to be transmitted in the final packet data to be transmitted to the mobile station (S3). If the packet data is the final packet data, the end notice of data transmission is performed to the mobile station using the dedicated physical control channel (DL DPCH) (S4).

Referring to FIG. 4, the mobile station checks whether the packet data is demanded or not (S101). If demanded, the channel for communication with the base station or a base station control unit is established in order to communicate the user information and the control information (S102). Next, the mobile station makes judgment whether the preliminary notice of data transmission is received from the base station (S103). If the preliminary notice is received, the quality information is transmitted to the base station (S104). Next, judgment is made whether the end notice of data transmission is received from the base station (S105). If the end notice is received, check is performed whether the packet data is newly received or not (S106). If it is confirmed that the new packet data is not generated for a predetermined period (S107), the set uplink (hereinafter UL) HS-DPCH is released (S108).

Figure 5:
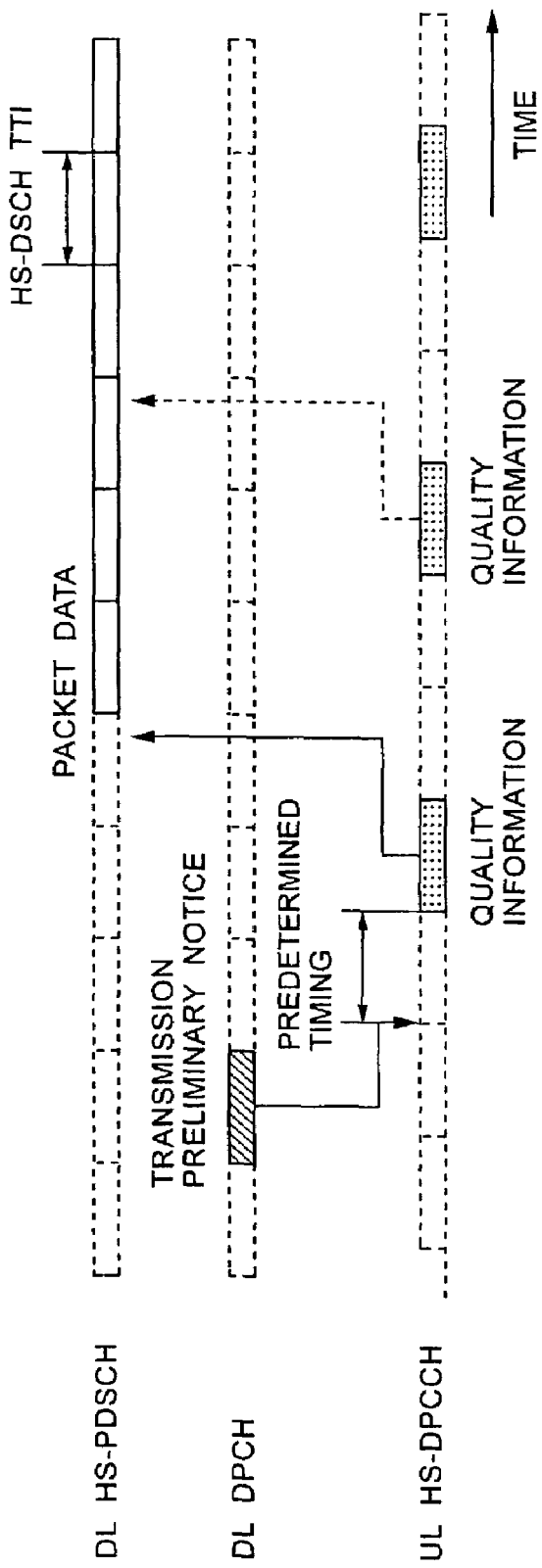
FIG. 5 is an illustration for explaining a principle of the first embodiment.
Figure 6:
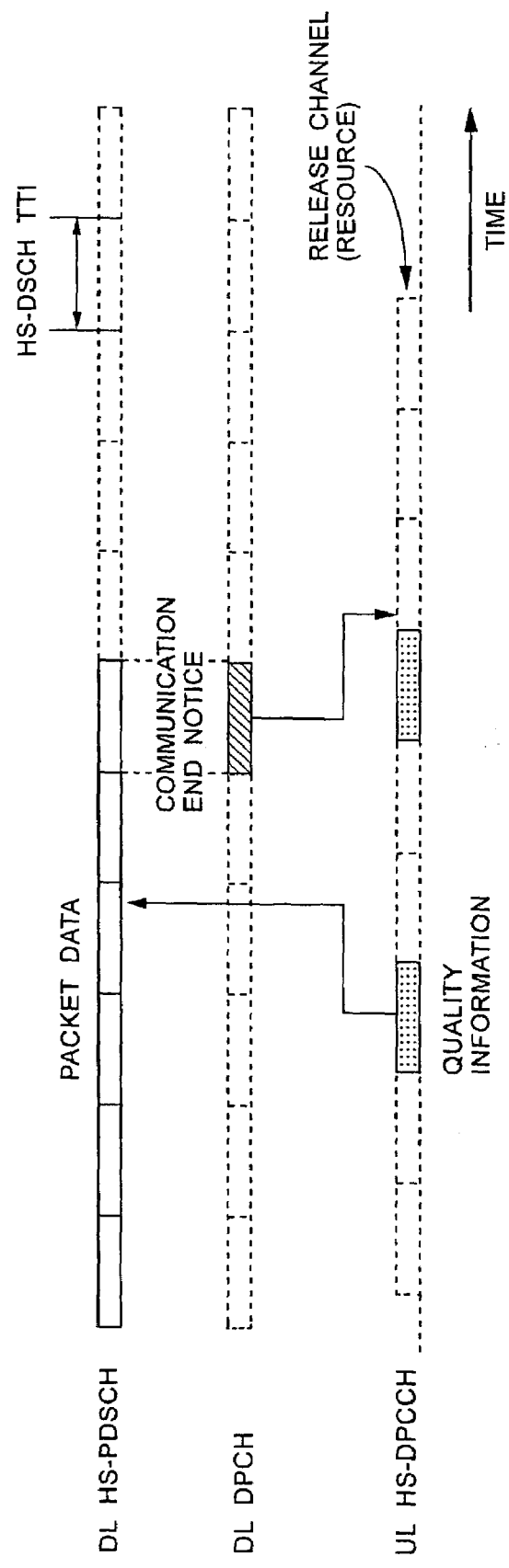
FIG. 6 is an illustration for explaining a principle of the first embodiment.

FIGS. 5 and 6 show conceptual illustration of principle of the first embodiment. In HSDPA system, in order to control data transmission from the base station to the mobile station, UL DPCH and UL HS-DPCCH are set. In the shown embodiment, since the control data of UL DPCH is used in transmission control of the quality information, UL DPCH is not illustrated in the drawings.

FIG. 5 shows a manner of transmission of the quality information with a given interval from the predetermined timing after reception of the preliminary notice of data transmission by the mobile station. In the shown embodiment (and even in other embodiments), the interval of transmission is set constant at 3 TTI (Transmission Time Interval). However, upon implementation, the interval can be either constant or variable. FIG. 6 shows a manner of stopping transmission of quality information after reception of the end notice of data transmission by the mobile station. In the shown embodiment, while transmission of the quality information is stopped by releasing the UL HS-DPCCH, it is also possible to realize stopping of transmission of the quality information by making transmission power smaller.

Figure 7:
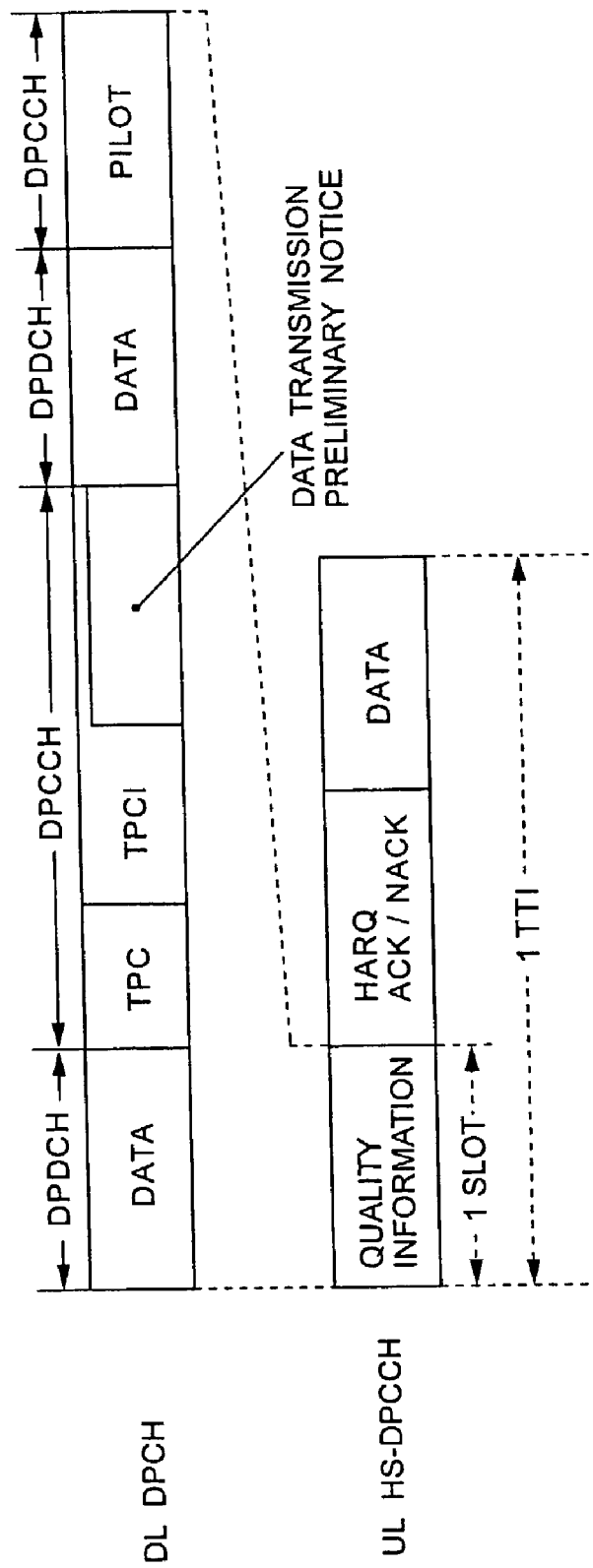
FIG. 7 is an illustration showing examples of respective formats of DL DPCH and UL HS-DPCCH to be used in the first embodiment.

Examples of respective formats of DL DPCH (Dedicated Physical Channel) for transmitting the preliminary notice of data transmission and UL HS-DPCCH (High Speed-Dedicated Physical Control Channel) for transmitting the quality information are shown in FIG. 7. DL DPCH is consisted of DPCCH and DPDCH (Dedicated Physical Data Channel). DL DPCH includes a transmission power control (TPC) information, TFCI (Transport Format Combination Indicator), a pilot signal (dedicated) and the user data. TFCI is information indicative of number of transport channels multiplexed on a reception frame of the uplink DPDCH and information of transport format used by each transport channel. In the shown embodiment of the present invention, a part of a region of TFCI is used as a bit for preliminary notice of data transmission. A DL common channel may also be used in replace of DL DPCH.

The UL HS-DPCCH is the uplink control channel used for transmission of quality information ACK/NACK of HARQ. In the format of the shown embodiment, content of data is varied per 1TTI in sequential order of quality information, ACK/NACK of HARQ and other communication data. Here, HARQ indicates a system for inspection of received symbol by the mobile station for judgment whether re-transmission is to be requested or not. Upon success of reception, ACK is transmitted.

Next, discussion will be given for the second embodiment of the present invention. In the former first embodiment, while the base station issues end notice of data transmission at step S4 of the flowchart in FIG. 3, the end notice is not issued in the second embodiment. In the second embodiment, when the mobile station makes judgment that the final packet data is received, reporting of the quality information is stopped. In the shown embodiment, after reception of the preliminary notice of data transmission transmitted by the base station, the mobile station transmits the quality information. After reception of the final packet data, the mobile station stops transmission of the quality information. Thus, battery operation period of the mobile station can be expanded. Furthermore, upon stopping transmission of the quality information, since uplink quality control channel is released, only a part of mobile stations among a large number of mobile stations set UL HS-DPCCH to reduce uplink interference power and to increase capacity of the uplink radio channel.

Figure 8:
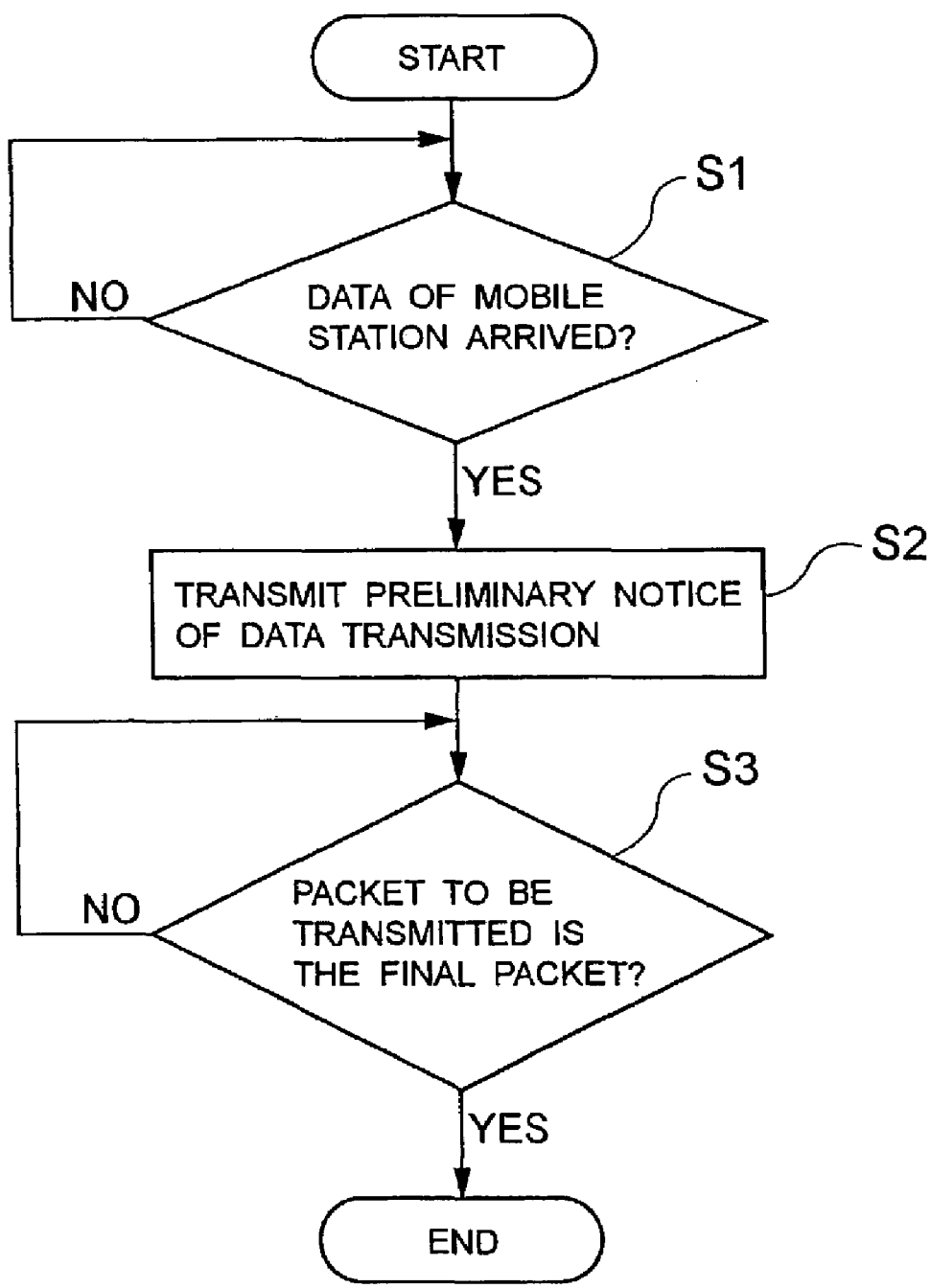
FIG. 8 is a flowchart showing operation of the second embodiment of a base station according to the present invention.
Figure 9:
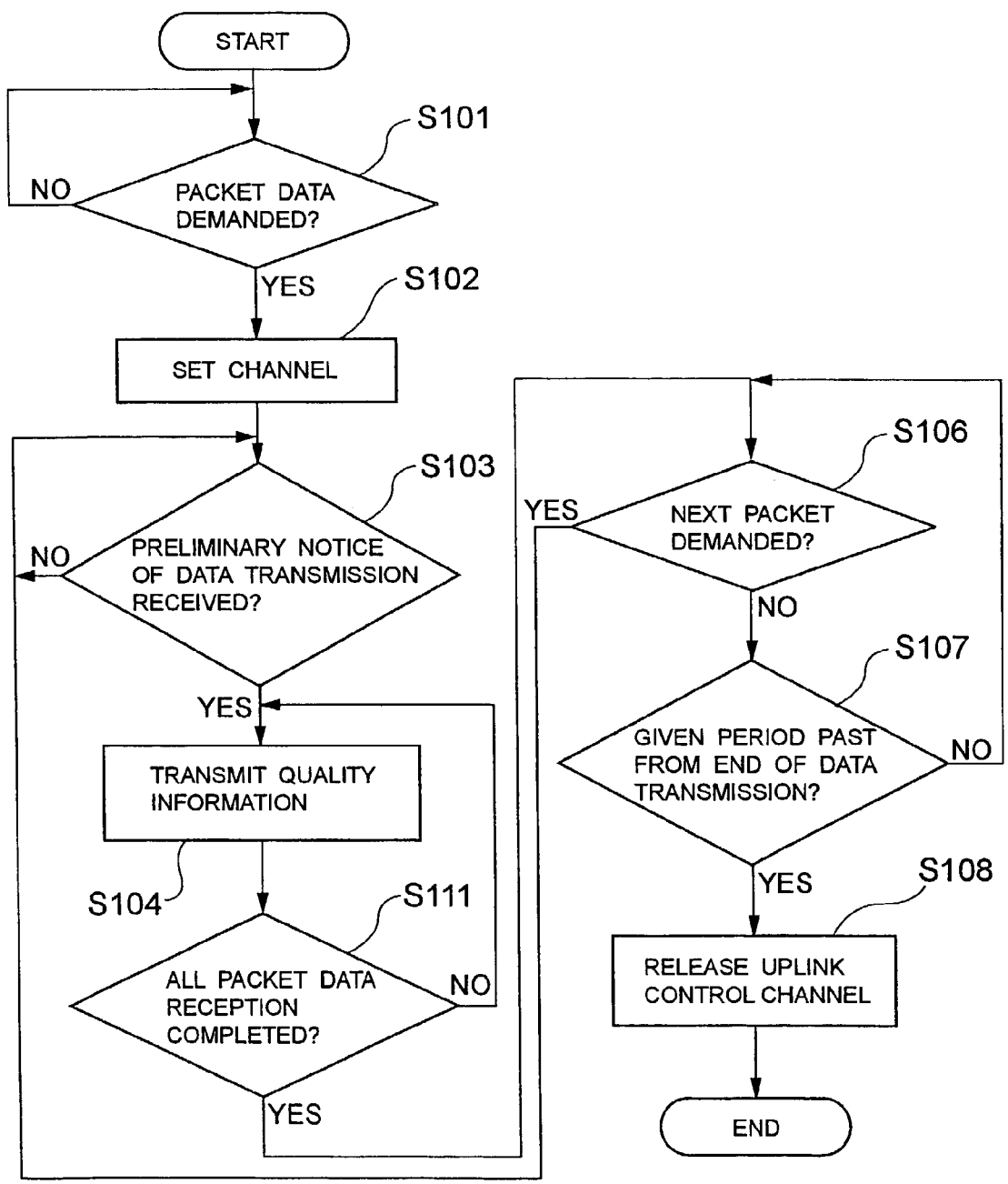
FIG. 9 is a flowchart showing operation of the second embodiment of a mobile station according to the present invention.

FIGS. 8 and 9 are flowcharts showing operation of the second embodiment of the present invention set forth above. FIG. 8 is a flowchart showing operation of the base station, in which S4 is eliminated from the flowchart shown in FIG. 3. Namely, the control information to be notified to the mobile station is only preliminary notice of the data transmission. FIG. 9 is a flowchart showing operation of the mobile station, in which step S105 in the flowchart of the first embodiment shown in FIG. 4 is modified to step S111. Namely, after transmission of the quality information (S104), judgment is made whether the final packet data is received (S111). If the final packet data is received, judgment is made whether new packet data is demanded or not (S106).

Figure 10:
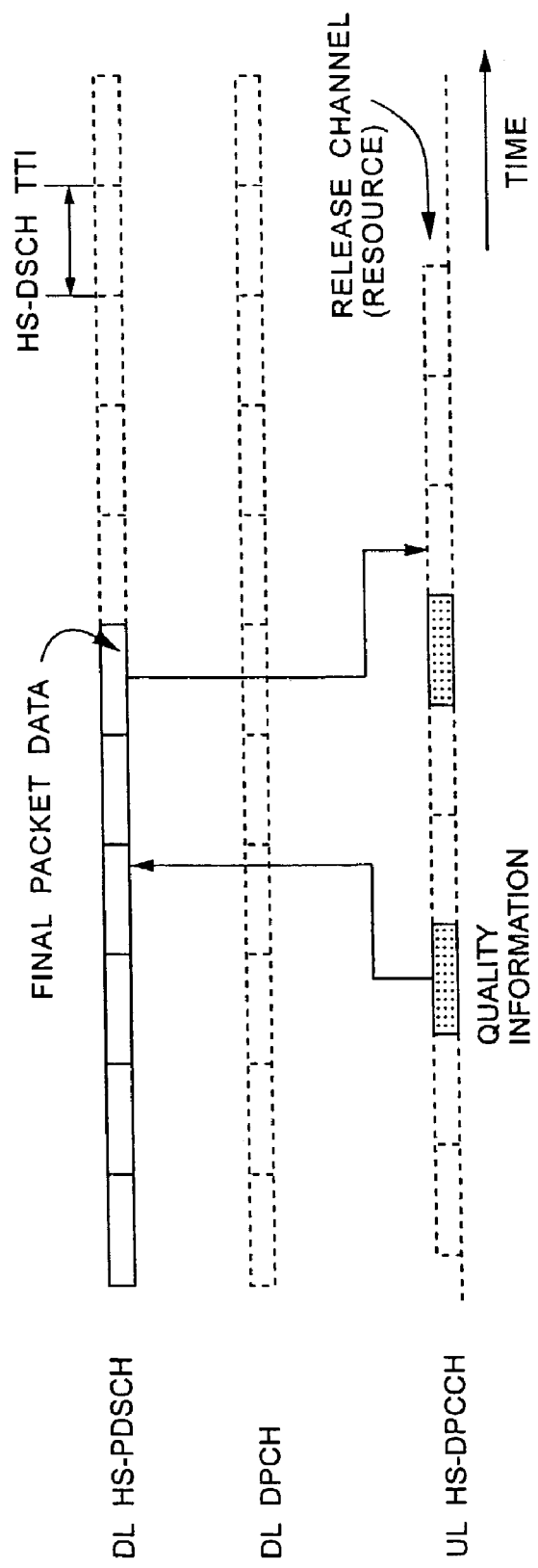
FIG. 10 is an illustration for explaining a principle of the second embodiment.

FIG. 10 is a conceptual illustration showing a principle of the second embodiment of the present invention. FIG. 10 shows a manner of stopping transmission of the quality information by the mobile station after ending reception of all packet data. In the shown embodiment, transmission of quality information is stopped by releasing UL HS-DPCCH. However, it is also possible to realize stopping of transmission of the quality information by making transmission power small.

Next, discussion will be given for the third embodiment of the present invention. In the former two embodiments, at step S103 of the flowchart of FIG. 9, judgment is made whether the preliminary notice of data transmission is received from the base station by the mobile station, the preliminary notice of data transmission is not issued in the third embodiment. At the same time of transmission of the quality information, indicator information (hereinafter referred to as Feedback Indicator) indicative of on transmission of the quality information is transmitted. By transmitting the Feedback Indicator by the mobile station, the base station may make judgment that the quality information is transmitted by the mobile station.

In the shown embodiment, the mobile station transmits the quality information at a predetermined timing from setting of channel with the base station and terminates transmission of the quality information after receiving the final packet data. Therefore, battery operation period of the mobile station can be expanded. Furthermore, upon stopping transmission of the quality information, uplink quality control channel is released, only a part of mobile stations among a large number of mobile stations set UL HS-DPCCH to reduce uplink interference power and to increase capacity of the uplink radio channel. Furthermore, since Feedback Indicator is transmitted upon transmission of the quality information, the base station can certainly receive the quality information.

Figure 11:
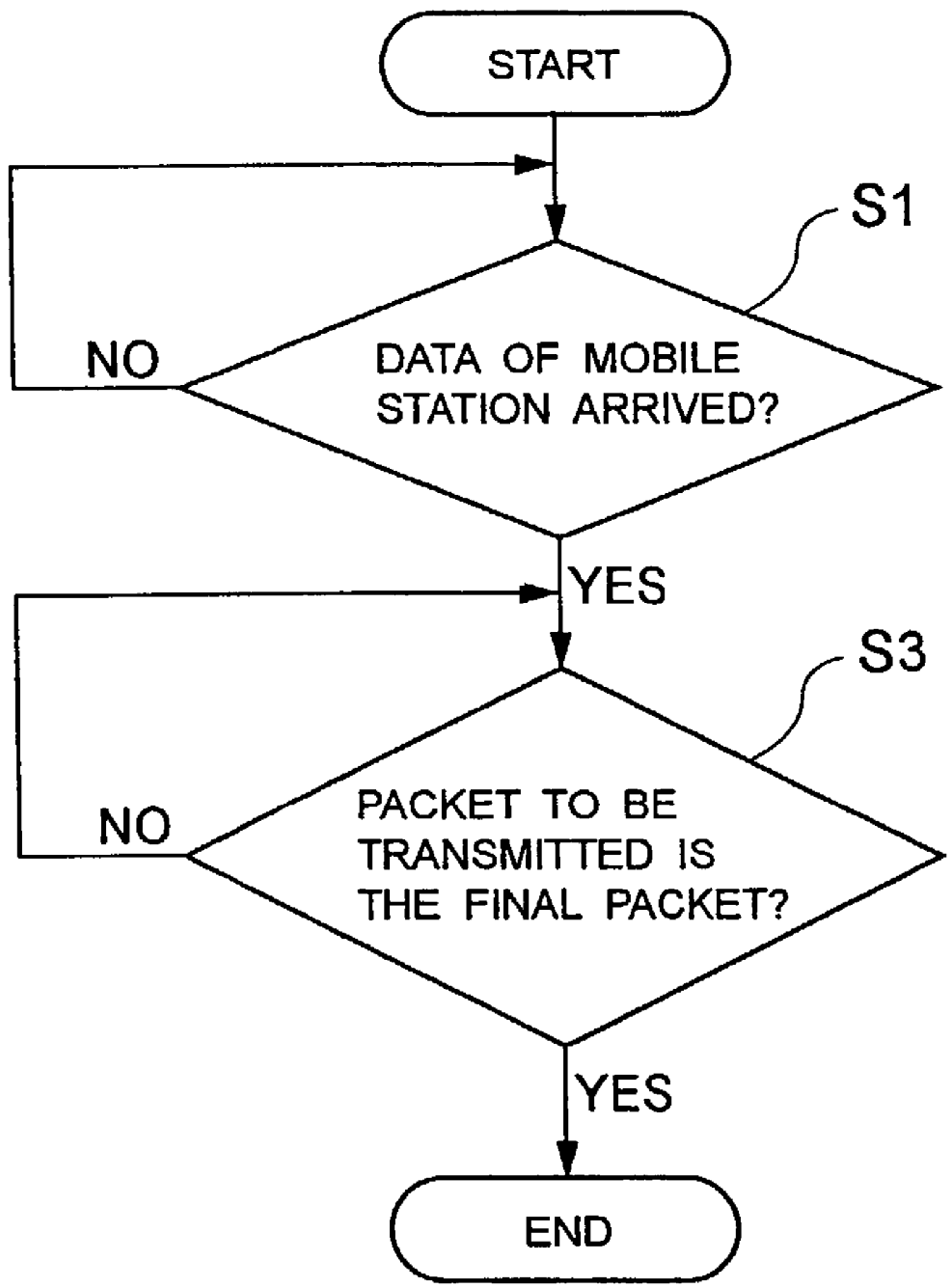
FIG. 11 is a flowchart showing operation of the third embodiment of a base station according to the present invention.
Figure 12:
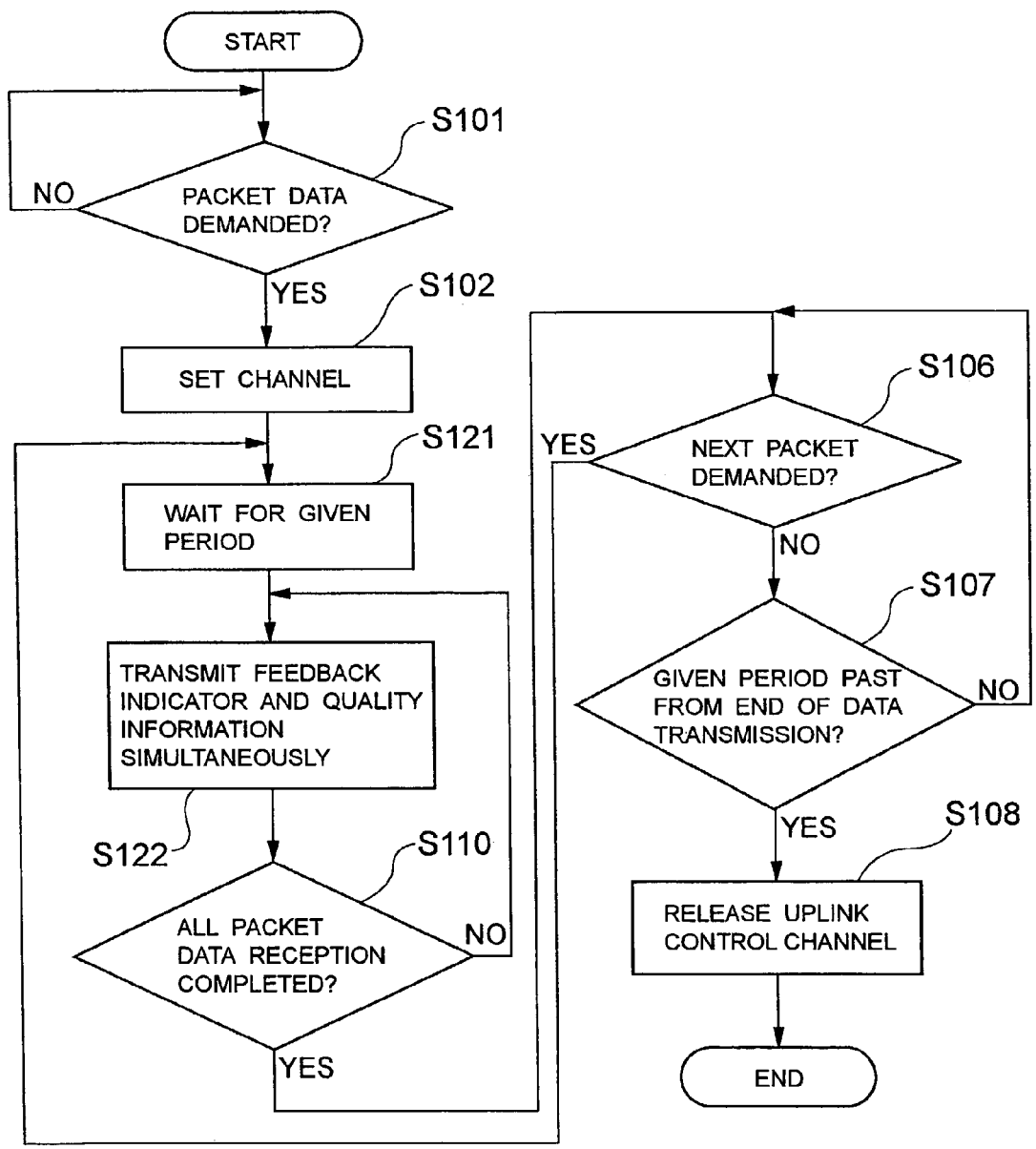
FIG. 12 is a flowchart showing operation of the third embodiment of a mobile station according to the present invention.

FIGS. 11 and 12 are flowcharts showing operation of the third embodiment of the present invention. FIG. 11 is a flowchart showing operation of the base station, in which step S2 is eliminated from the flowchart of the second embodiment shown in FIG. 8. Namely, the base station does not issue notice of the control information to the mobile station. Judgment is made whether the packet data demanded by the mobile station is arrived or not (S1). If the packet data arrives, data is transmitted to the mobile station according to a scheduling. Then, judgment is made that the packet data to be transmitted is the final packet or not (S3), if the packet data to be transmitted is the final packet, process is terminated.

FIG. 12 is a flowchart showing operation of the mobile station, in which the process in step S103 of flowchart of the second embodiment shown in FIG. 9 is modified to step S121, and the process in step S104 of flowchart of the second embodiment shown in FIG. 9 is modified to step S122. Namely, waiting a predetermined period after setting channel with the base station (S121), the mobile station transmits the Feedback Indicator and transmission quality information simultaneously (S122).

Figure 13:
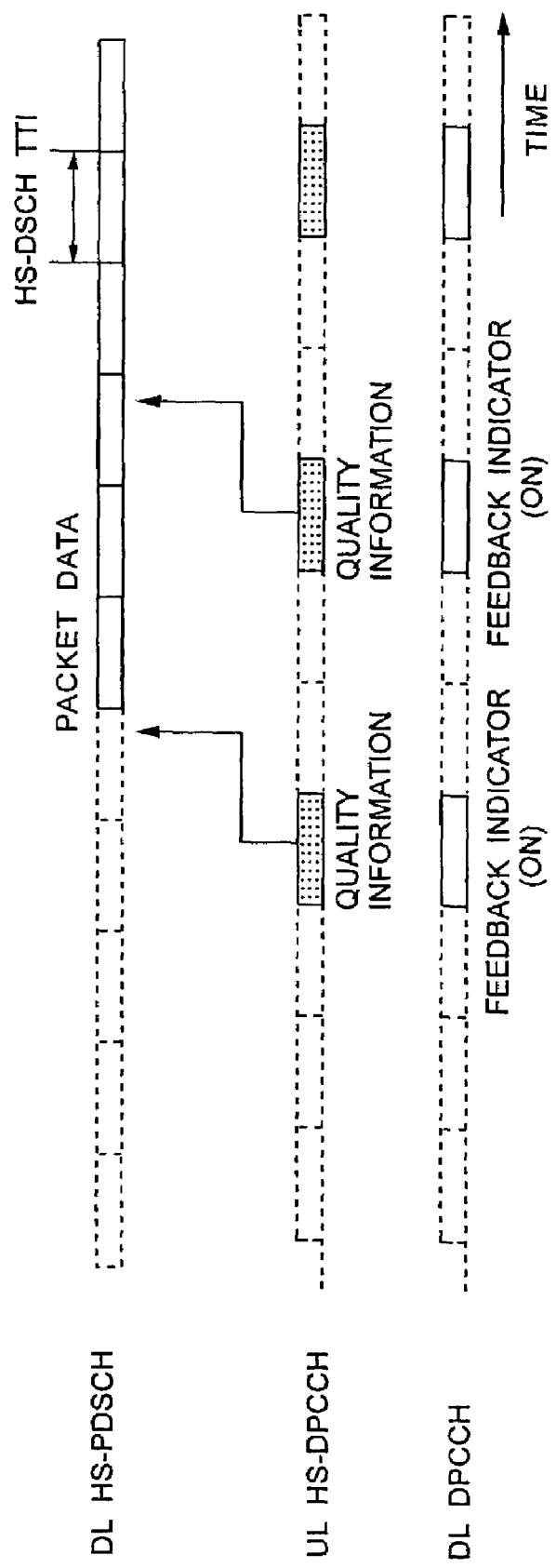
FIG. 13 is an illustration for explaining a principle of the third embodiment.
Figure 14:
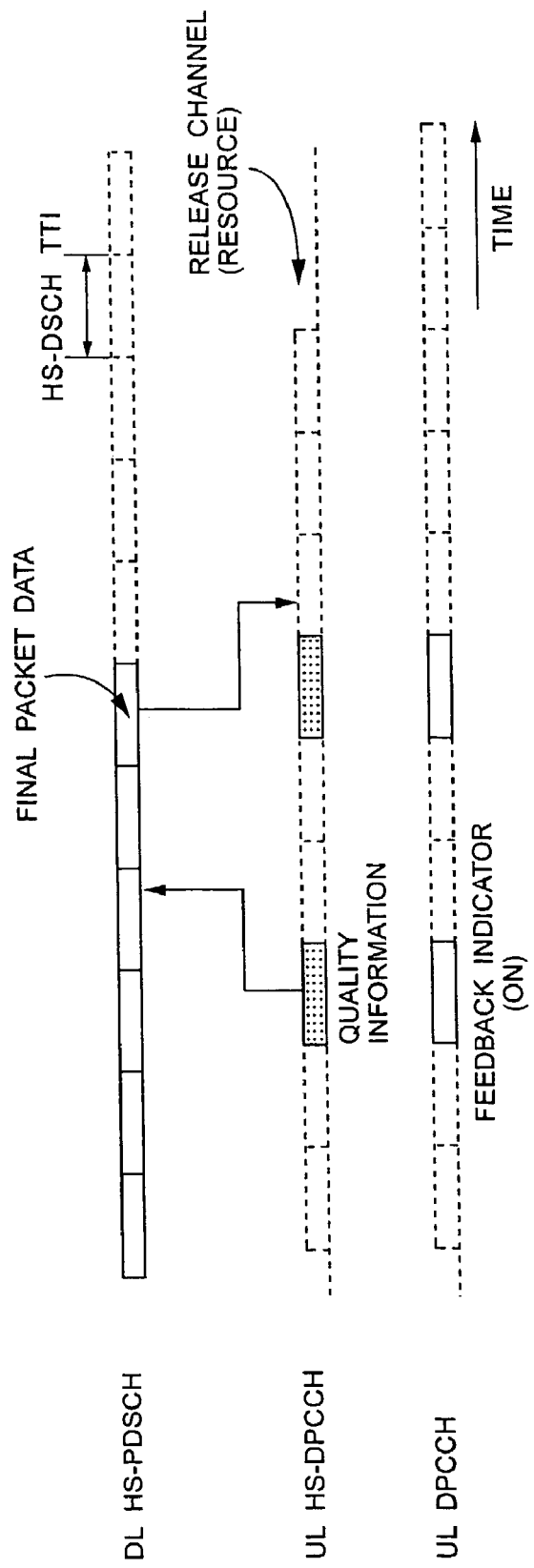
FIG. 14 is an illustration for explaining a principle of the third embodiment.

FIGS. 13 and 14 are conceptual illustration of the principle of the shown embodiment. UL DPCH and UL HS-DPCCH may be set in code multiplexing or in time sharing. FIG. 13 shows a condition where the mobile station transmits the quality information at a predetermined interval starting from a predetermined timing, and the quality information and the Feedback Indicator are transmitted simultaneously. In the shown embodiment, immediately after reception of the quality information by the base station, the packet data is continuously transmitted to the mobile station. However, it is also possible to provide a given a given delay for the transmission initiation timing, and to transmit the packet data in discontinuous manner.

FIG. 14 shows a manner of stopping transmission of the quality information after completion of all packet data by the mobile station. Since transmission of the quality information is stopped, transmission of the Feedback Indicator to be transmitted simultaneously with the quality information is also stopped. In the shown embodiment, while transmission of the quality information is stopped by releasing the UL HS-DPCCH, it is also possible to realize stopping of transmission of the quality information by making transmission power small.

Figure 15:
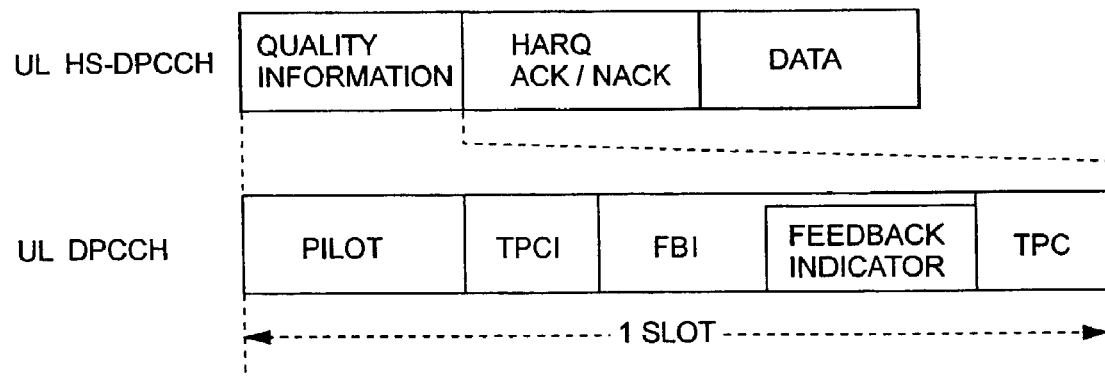
FIG. 15 is an illustration showing examples of respective formats of DL DPCH and UL HS-DPCCH to be used in the third embodiment.

FIG. 15 shows respective formats of UL HS-DPCCH for transmitting the quality information and UL DPCCH for transmitting Feedback Indicator. UL-DPCCH is the same as the first embodiment of FIG. 7. DL DPCH includes a pilot signal (individual), TFCI, a feedback information (FBI) and a transmission power control (TPC). In the shown embodiment, a part of a region of FBI is used as bit for Feedback Indicator. It is also possible to use UL common channel in place of UL DPCH.

Next, discussion will be given for the fourth embodiment of the present invention. The fourth embodiment is established by combination of the processes of the first embodiment and the third embodiment. Namely, the base station issues the preliminary notice of data transmission and end notice of data transmission to the mobile station. Upon reporting of the quality information, the mobile station transmits the Feedback Indicator, simultaneously In the shown embodiment, after receiving preliminary notice of data transmission transmitted by the base station, the mobile station transmits the quality information. On the other hand, after reception of the end notice of data transmission, the mobile station terminates transmission of the quality information. Thus, battery operation period of the mobile station can be expanded. Furthermore, upon stopping transmission of the quality information, uplink quality control channel is released, only a part of mobile stations among a large number of mobile stations set UL HS-DPCCH to reduce uplink interference power and to increase capacity of the uplink radio channel. In addition, since Feedback Indicator is transmitted upon transmitting the quality information, the base station can certainly receive the quality information.

Figure 16:
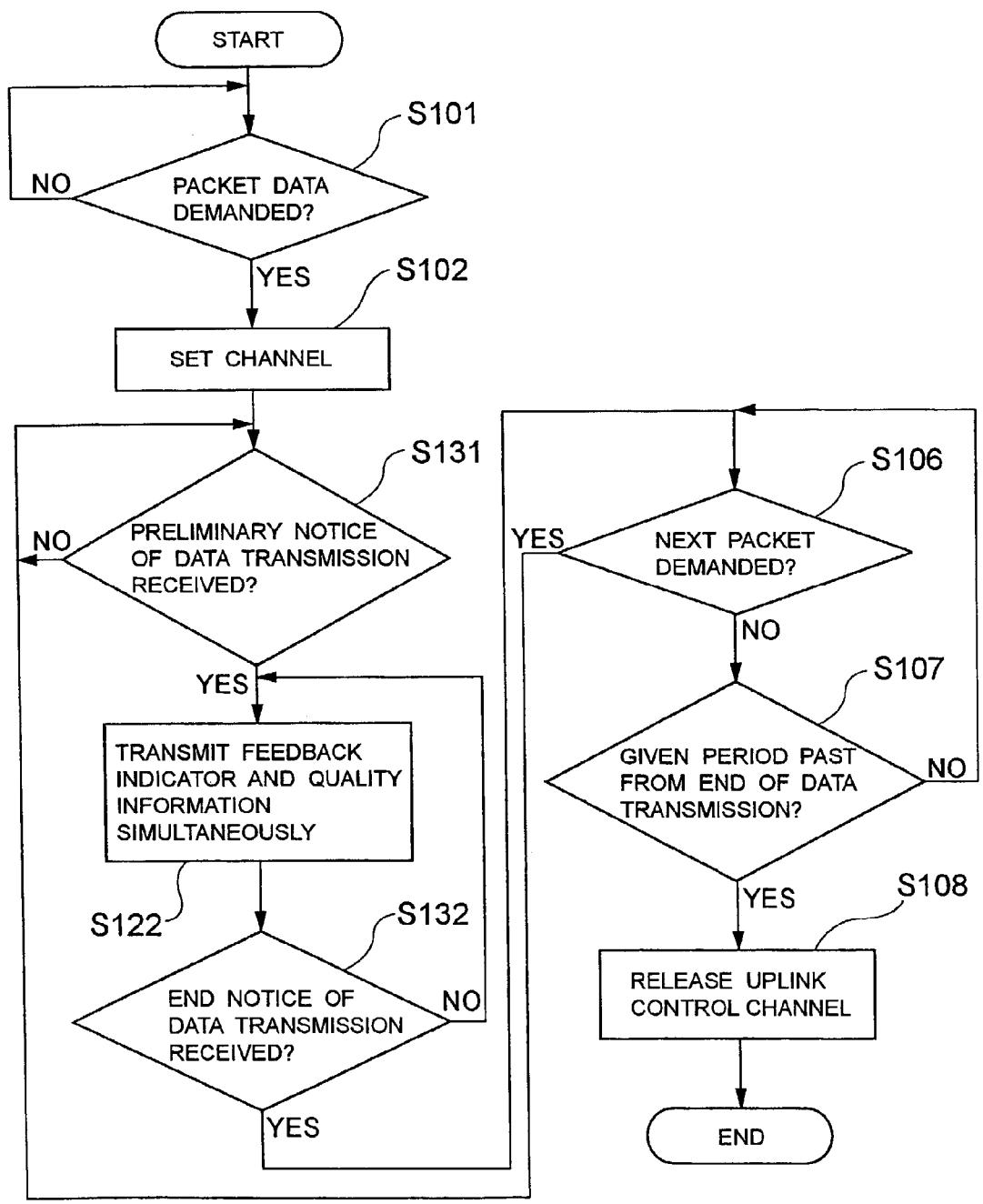
FIG. 16 is a flowchart showing operation of the fourth embodiment of a mobile station according to the present invention.

Operation of the base station in the shown embodiment is the same as that of the first embodiment illustrated in FIG. 3. FIG. 16 is a flowchart showing operation of the mobile station of the shown embodiment, in which the process in step S121 of flowchart of the third embodiment shown in FIG. 12 is modified to step S131, and the process in step S110 of flowchart of the second embodiment shown in FIG. 12 is modified to step S132. Namely, after setting channel (S102), the mobile station makes judgment whether the preliminary notice of data transmission is received from the base station (S131). If received, the mobile station transmits Feedback Indicator and the quality information simultaneously (S122). Next, judgment is made whether the end notice of data transmission is received from the base station (S132), if received, judgment is made whether new packet data is demanded or not (S106).

Figure 17:
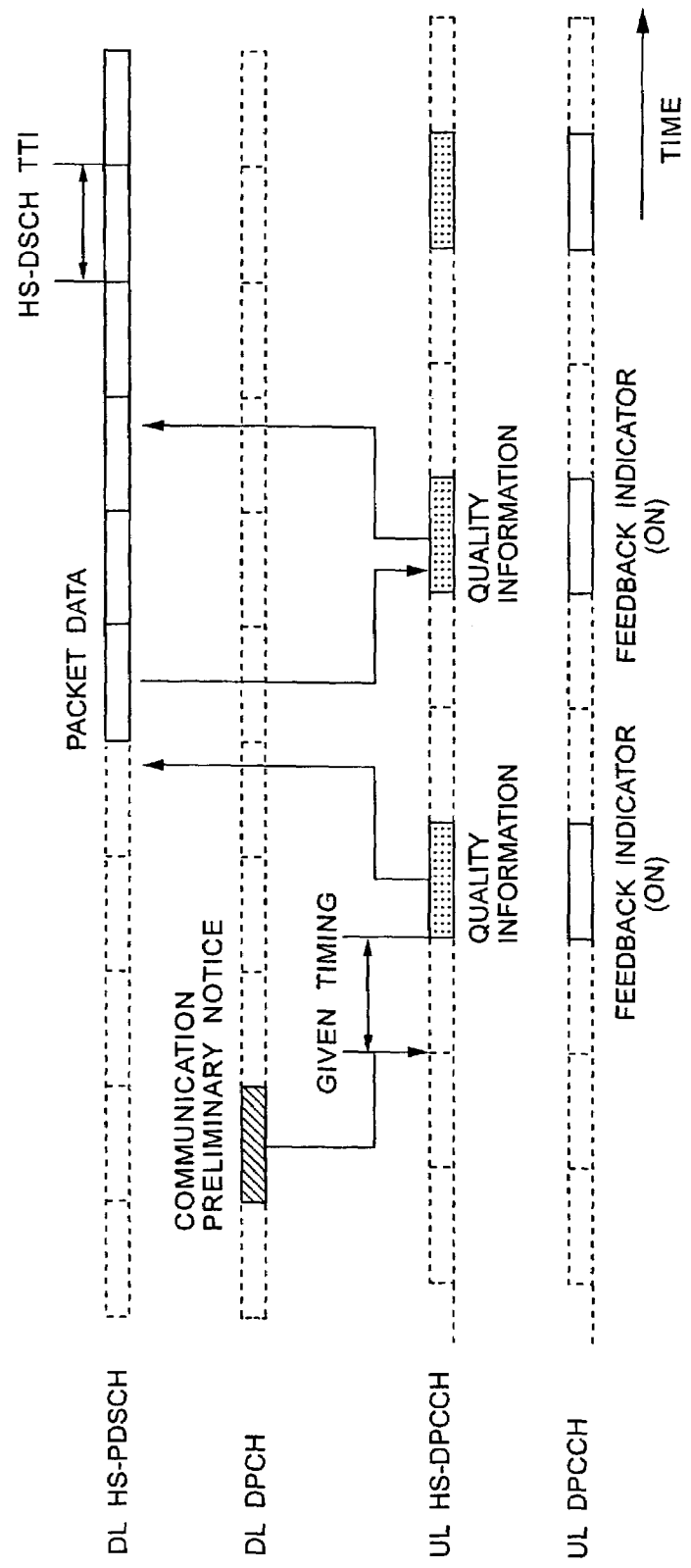
FIG. 17 is an illustration for explaining a principle of the fourth embodiment.
Figure 18:
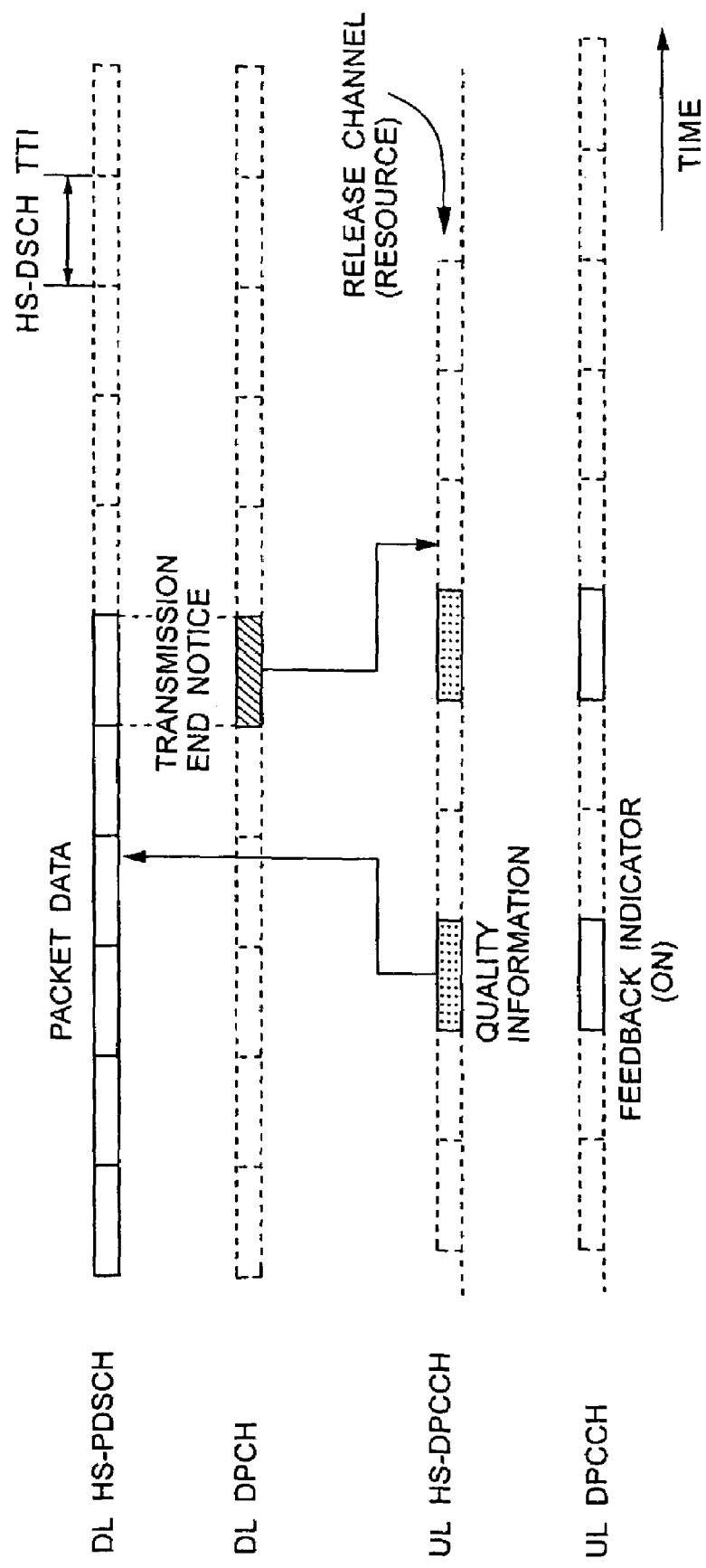
FIG. 18 is an illustration for explaining a principle of the fourth embodiment.

FIGS. 17 and 18 show conceptual illustration of the principle of the shown embodiment. FIG. 17 shows the condition where the quality information is transmitted at the predetermined interval from the predetermined timing after reception of the preliminary notice of data transmission by the mobile station, and the quality information and Feedback Indicator are transmitted simultaneously. FIG. 18 shows the manner of stopping transmission of the quality information after reception of the end notice of data transmission by the mobile station. Transmission of the quality information is stopped, then transmission of the Feed back Indicator which is transmitted simultaneously with the quality information, is also stopped. In the shown embodiment, UL HS-DPCCH is released to stop quality information. However, it is also possible to stop the transmission of the quality information by making the transmission power smaller.

Next, discussion will be given for the fifth embodiment of the present invention. In the former fourth embodiments, the base station issues the end notice of data transmission at step S4 of the flowchart shown in FIG. 3. However, the fifth embodiment does not issue the end notice. In the fifth embodiment, the mobile station stops reporting of the quality information when the mobile station receives the final packet data.

In the shown embodiment, after receiving the preliminary notice of data transmission transmitted by the base station, the mobile station transmits the quality information. Also, after receiving the final packet data, the mobile station stops transmission of the quality information. Thus, battery operation period of the mobile station can be expanded. Furthermore, upon stopping transmission of the quality information, uplink quality control channel is released, only a part of mobile stations among a large number of mobile stations set UL HS-DPCCH to reduce uplink interference power and to increase capacity of the uplink radio channel. Furthermore, since Feedback Indicator is transmitted upon transmission of the quality information, the base station can certainly receive the quality information. It should be noted that the operation of the base station in the shown embodiment is the same as that shown in the flowchart of the second embodiment shown in FIG. 8.

Figure 19:
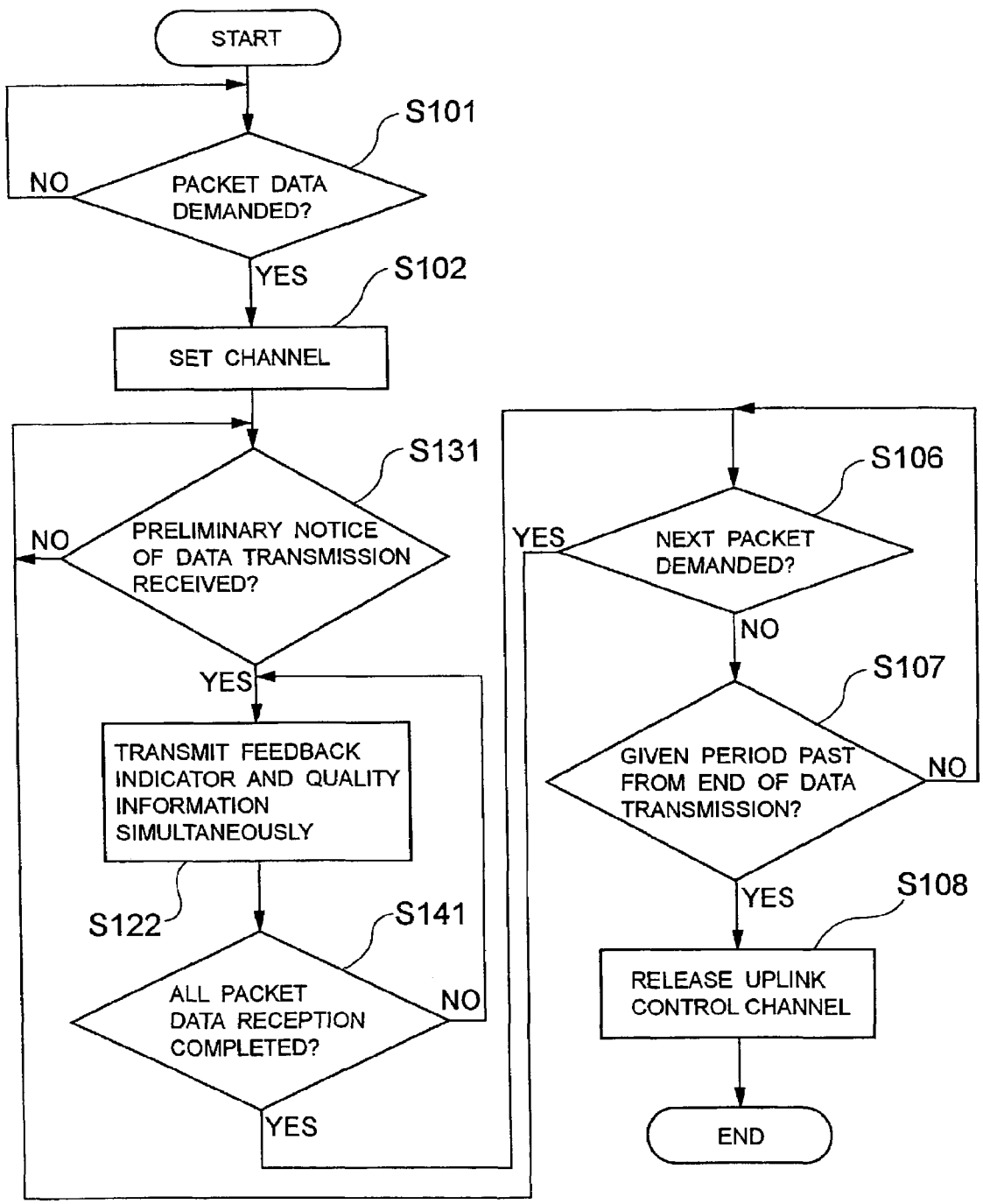
FIG. 19 is a flowchart showing operation of the fifth embodiment of a mobile station according to the present invention.

FIG. 19 is a flowchart showing operation of the mobile station of the shown embodiment. FIG. 19 shows a flowchart, in which step S132 of the flowchart of FIG. 16 is modified to step S141. Namely, after transmitting the Feedback Indicator and the quality information to the base station simultaneously (S122), judgment is made whether the final packet data is received or not (S141). If the final packet data is received, judgment is made whether new packet data is not demanded (S106).

Figure 20:
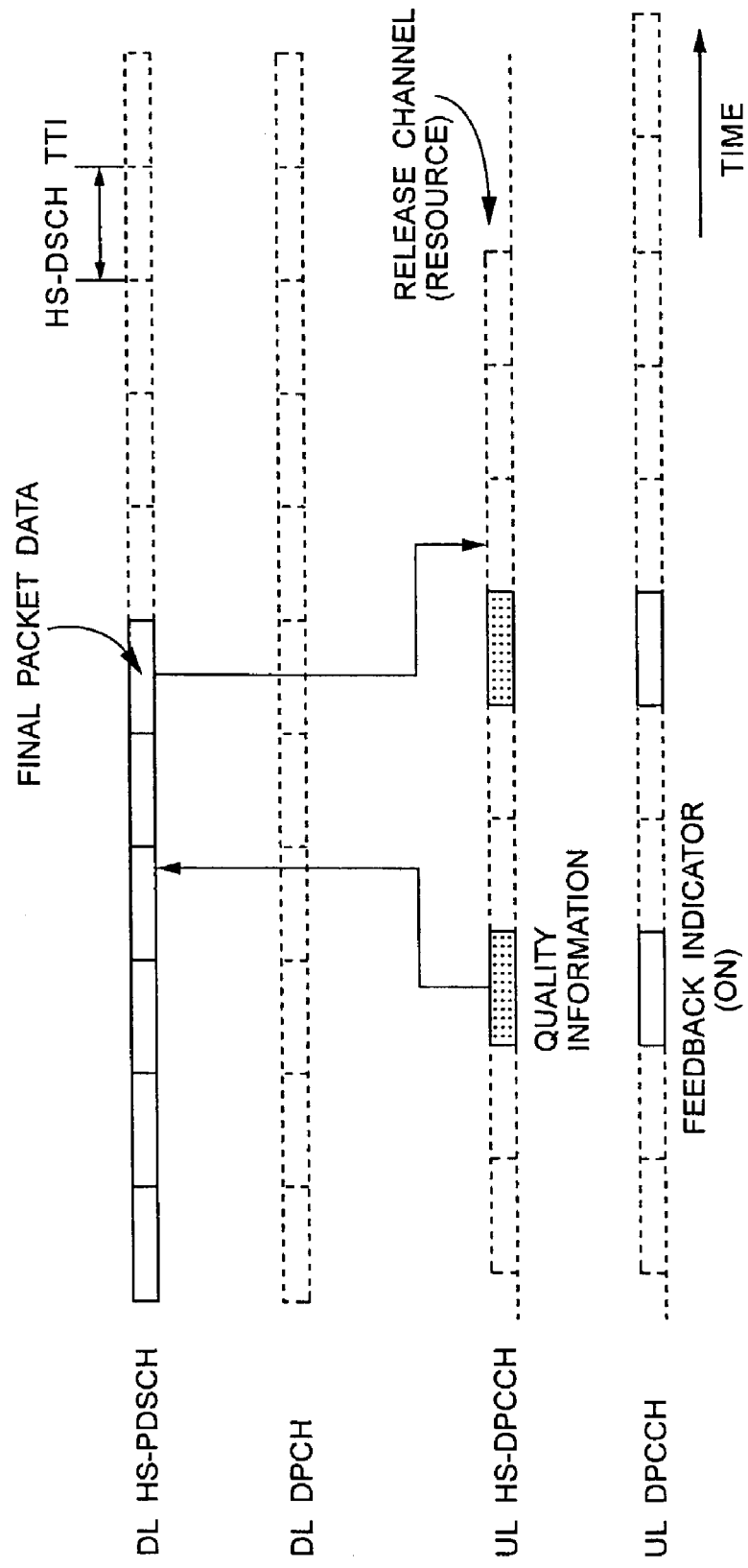
FIG. 20 is an illustration for explaining a principle of the fifth embodiment.

FIG. 20 is a conceptual illustration showing the principle of the shown embodiment. FIG. 20 shows a manner for stopping transmission of quality information after completion of reception of all packet data in the mobile station, and a manner for stopping transmission of the Feedback Indicator simultaneously with stopping transmission of the quality information. In the shown embodiment, while transmission of the quality information is stopped by releasing the UL HS-DPCCH, it is also possible to realize stopping of transmission of the quality information by making transmission power smaller.

Next, the sixth embodiment of the present invention will be discussed. The base station transmits a threshold value for making the mobile station transmit the quality information to the mobile station as the control information. The mobile station measures its own quality information. When the reception quality is in excess of the threshold value, the quality information is reported. At this time, the Feedback Indicator is also transmitted simultaneously with the quality information.

In the shown embodiment, the mobile station transmits the quality information at a predetermined timing after setting channel with the base station. Also, after receiving the final packet data, the mobile station stops transmission of the quality information. Thus, battery operation period of the mobile station can be expanded. Furthermore, upon stopping transmission of the quality information, uplink quality control channel is released, only a part of mobile stations among a large number of mobile stations set UL HS-DPCCH to reduce uplink interference power and to increase capacity of the uplink radio channel. Furthermore, since the Feedback Indicator is transmitted upon transmission of the quality information, the base station can certainly receive the quality information. Furthermore, since the quality information is reported when the reception quality of the mobile station is greater than or equal to the threshold value, high speed packet transmission service with low error ratio can be performed.

Figure 21:
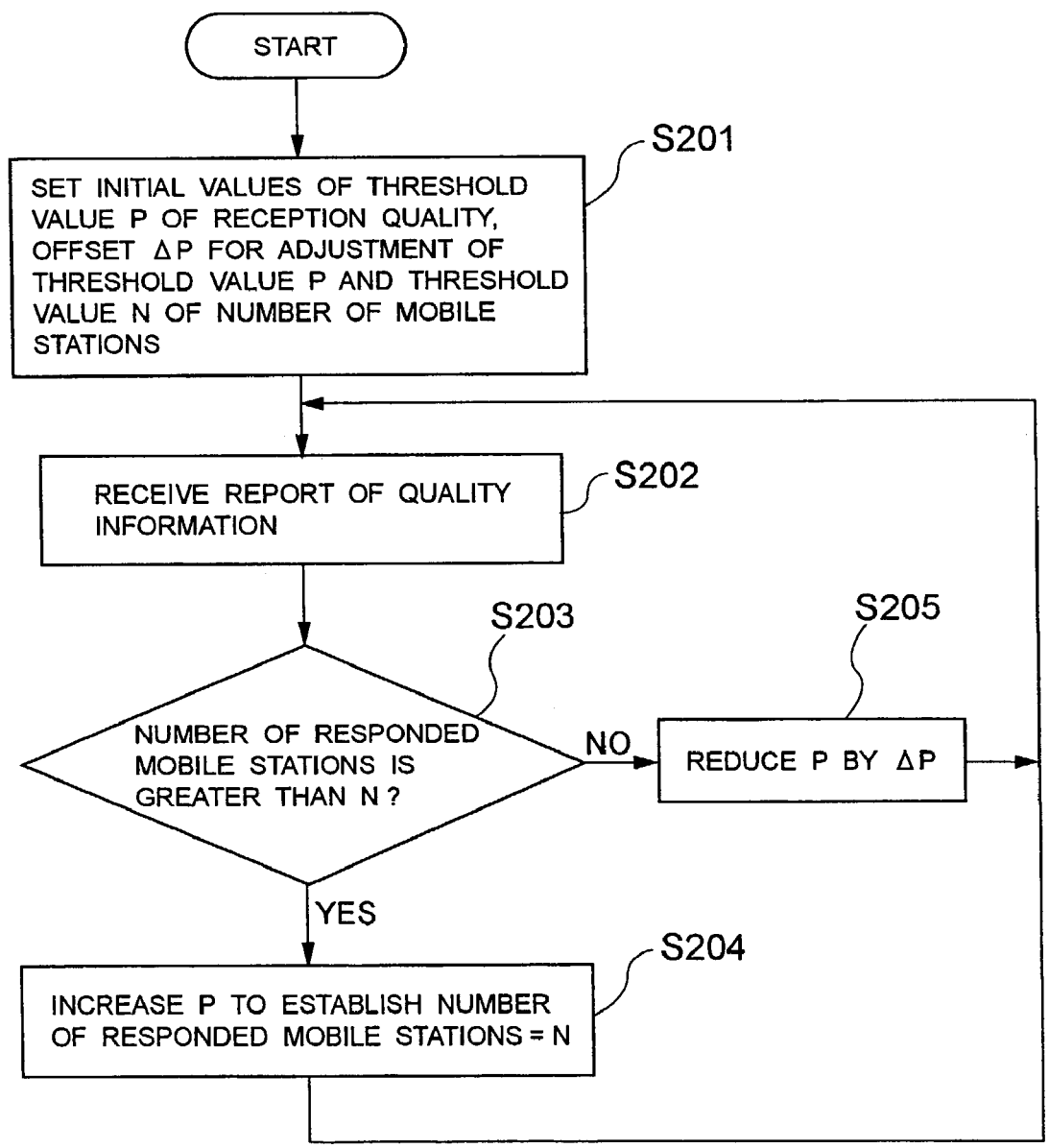
FIG. 21 is a flowchart showing operation of the sixth embodiment of a base station according to the present invention.
Figure 22:
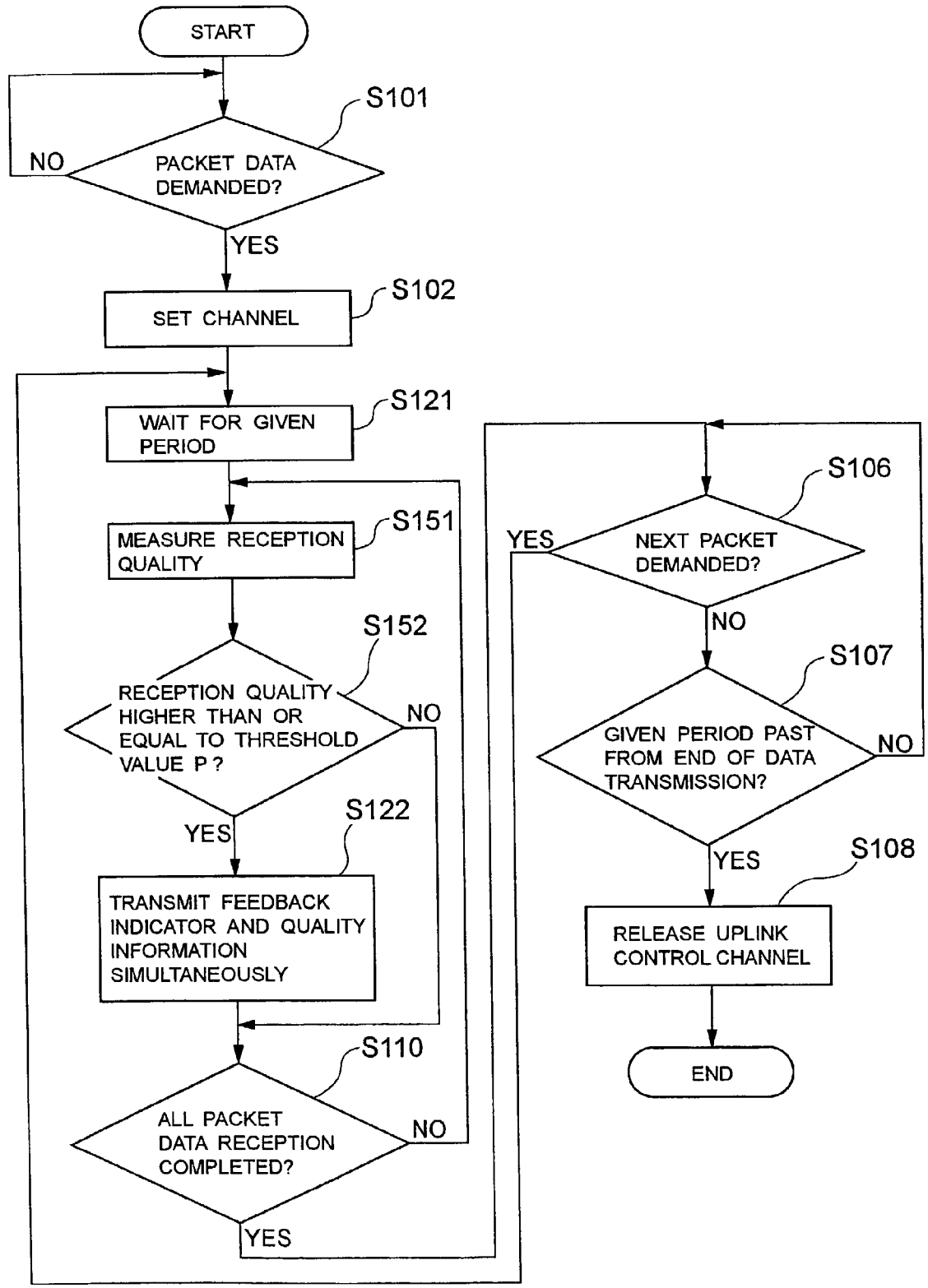
FIG. 22 is a flowchart showing operation of the sixth embodiment of a mobile station according to the present invention.

FIGS. 21 and 22 are flowcharts showing operations of the shown embodiment. FIG. 21 is a flowchart showing operation of the base station. In the base station, processing operation for setting the threshold value for making the mobile station transmit the quality information is realized. FIG. 22 is a flowchart showing operation of the mobile station. When the reception quality becomes greater than or equal to the threshold value based on the threshold value received from the base station, processing operation of the mobile station for transmitting the quality information to the base station is realized.

Referring to FIG. 21, the base station sets the threshold value P of the reception quality, an offset P for adjusting the threshold value and a threshold value N of number of mobile stations as initial values to transmit to respective mobile stations (S201). Next, the quality information is received from respective mobile stations (S202). Then, judgment is made whether the number of mobile stations which report the reception quality, is greater than N (S203). If the number of the responded mobile stations is greater than N, the quality information of the mobile station having Nth reception quality from the best quality is set as new threshold value P for transmitting the increased threshold value P to respective station so that number of the responded mobile station becomes N. (S204). On the other hand, if number of the responded mobile stations is less than N, P—P is set as new threshold value P to transmit to respective mobile stations (S205).

Thus, since number of the mobile stations which report the quality information to the base station is controlled to be the predetermined value N, only a part of mobile stations having high reception quality among a large number of mobile stations set UL HS-DPCCH. Lowering of uplink interference wave power becomes possible to increase capacity of the uplink radio channel.

FIG. 22 is a flowchart established by modifying step S122 of the flowchart of the third embodiment shown in FIG. 12 to steps S151 and S152. Namely, establishing setting of the channel with the base station, the mobile stations wait for expiration of the predetermined period (S121). Then, the reception quality is measured (S151). Then, judgment is made whether the reception quality is higher than the threshold value P notified from the base station (S152). If the reception quality is higher than or equal to the threshold value P, the Feedback Indicator and the quality information are transmitted simultaneously (S122).

Figure 23:
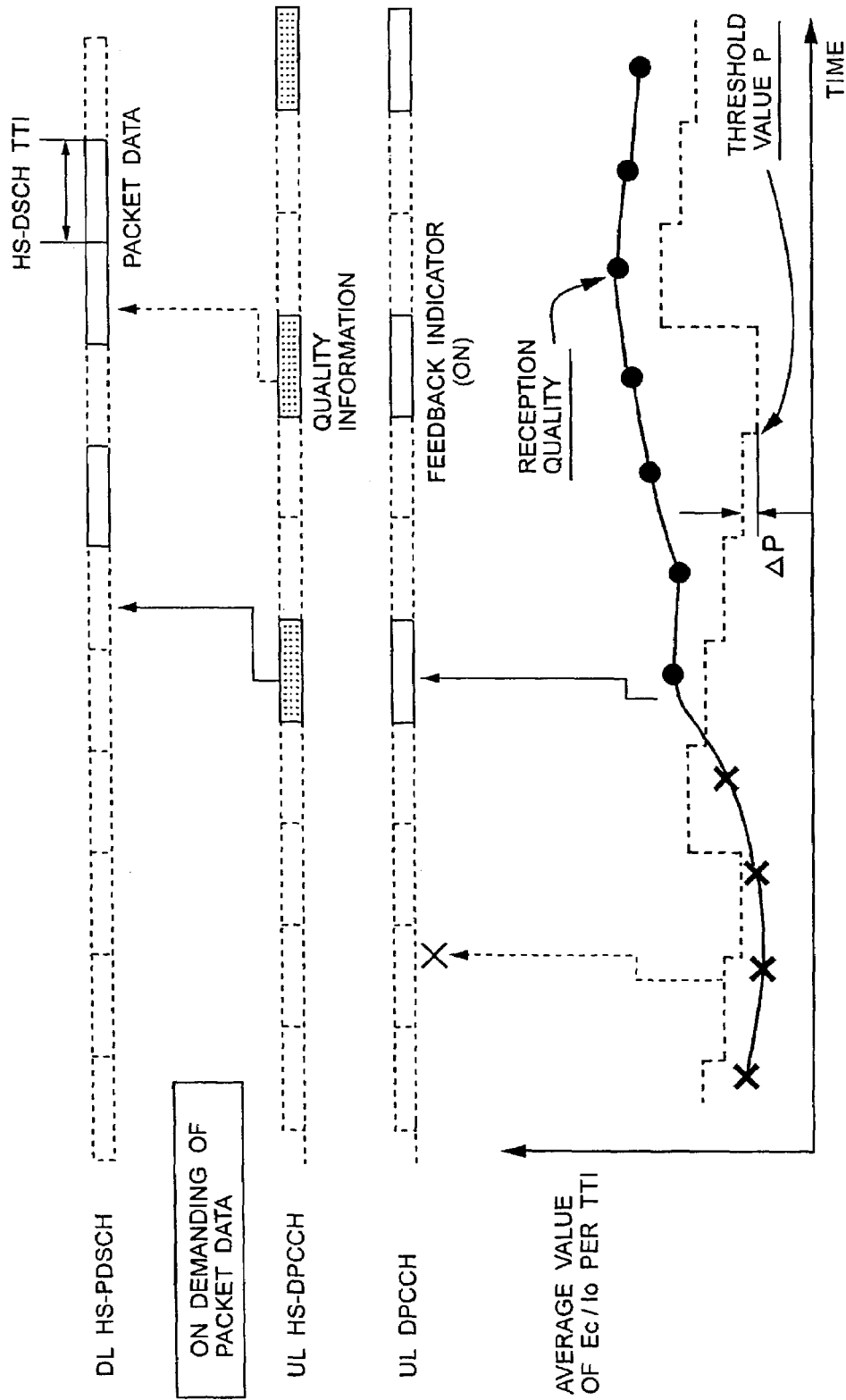
FIG. 23 is an illustration for explaining a principle of the sixth embodiment.

FIG. 23 is a conceptual illustration showing the principle of the shown embodiment. FIG. 23 shows a manner wherein the mobile station compares the reception quality and the threshold value P to transmit the quality information and the Feedback Indicator to the base station at a given interval when the quality information is greater than or equal to the threshold value. As shown in FIG. 23, initially, since the reception quality is lower than the threshold value P, the quality information is not reported. After elevating the reception quality to be higher than or equal to the threshold value P, the reception quality is reported from the mobile station to the base station.

In the shown embodiment, the threshold value is determined as illustrated by the flowchart of FIG. 21. However, the threshold value may be determined in various other ways. For example, the threshold value may be determined by the base station control unit. In the alternative, a given value is subtracted from an average value of the reception equality of all mobile stations responding to the base station to set as the threshold value.

Figure 24:
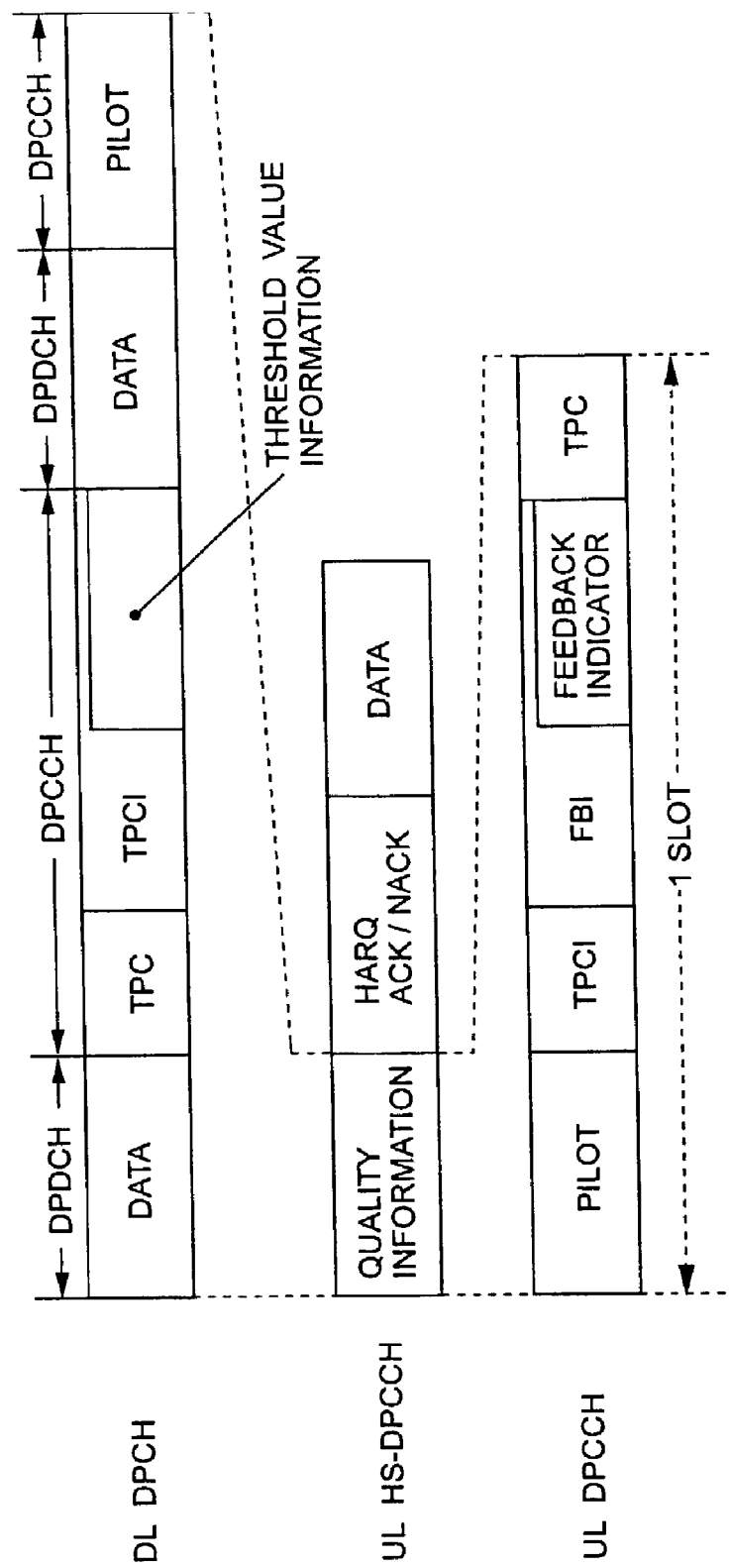
FIG. 24 is an illustration showing examples of respective formats of DL DPCH and UL HS-DPCCH to be used in the sixth embodiment.

FIG. 24 shows respective formats of DL DPCH transmitting the threshold value information, HS-DPCCH transmitting the quality information and UL DPCCH transmitting the Feedback Indicator. In the shown embodiment of the present invention, a part of the region of TFCI is used for transmitting the threshold value information P. The common channel may be used in replace of DL DPCH. UL HS-DPCCH and UL DPCCH are the same as the third embodiment shown in FIG. 15.

Next, the seventh embodiment of the present invention will be discussed. In the shown embodiment, the base station transmits command information (hereinafter referred to as Request Indicator) demanding report of quality information of data to the mobile station. When the mobile station continuously receives the Request Indicator in ON state for a predetermined number of times (hereinafter Non times), the quality information is transmitted to the base station by UL HS-DPCCH. On the other hand, when the mobile station continuously receives the Request Indicator in OFF state for a predetermined number of times (hereinafter Noff times), transmission of the quality information is stopped.

In the shown embodiment, since the mobile station receives the Request Indicators transmitted from the base station to judge start and stop of transmission of the quality information, the mobile station may transmit the quality information only as required by the base station. Therefore, battery operation period of the mobile station can be expanded. Furthermore, upon stopping transmission of the quality information, uplink quality control channel is released, only a part of mobile stations among a large number of mobile stations set UL HS-DPCCH to reduce uplink interference power and to increase capacity of the uplink radio channel.

In the shown embodiment, number of times of Non and Noff are set by the base station control unit which controls the base stations to be notified to the mobile stations from the base station upon setting DL DPCH. In the shown embodiment, it is set Non=1 time and Noff=5 times. By setting Non<Noff, the mobile station can quickly report the quality information when the base station requires the quality information. Even when the base station transmits the Request Indication in ON state but the mobile station receives the Request Indicator in OFF state by low receiving condition, probability of causing reception failure sequentially is low to successfully prevent erroneous stopping of reporting of the quality information.

Figure 25:
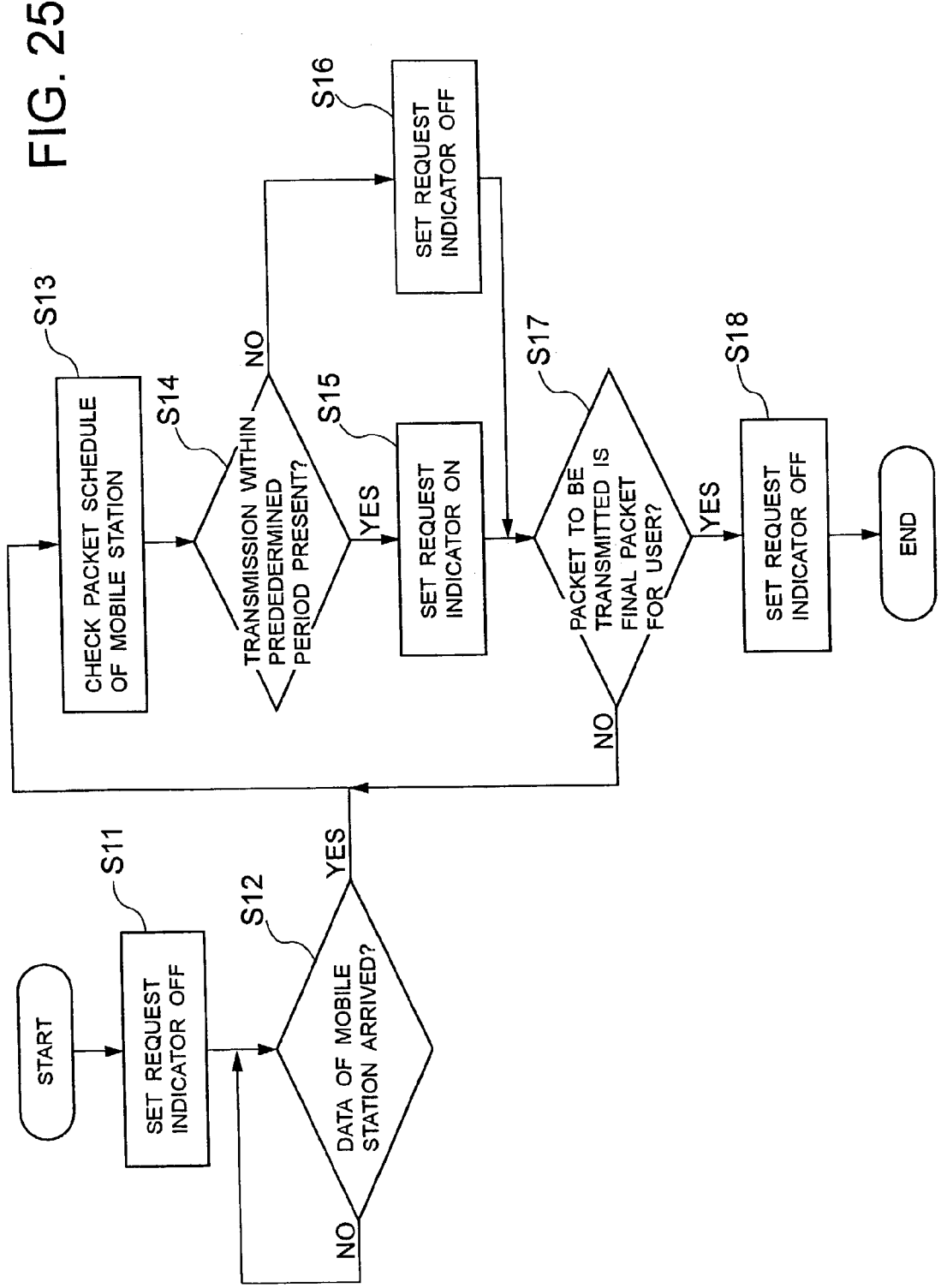
FIG. 25 is a flowchart showing operation of the seventh embodiment of a base station according to the present invention.
Figure 26:
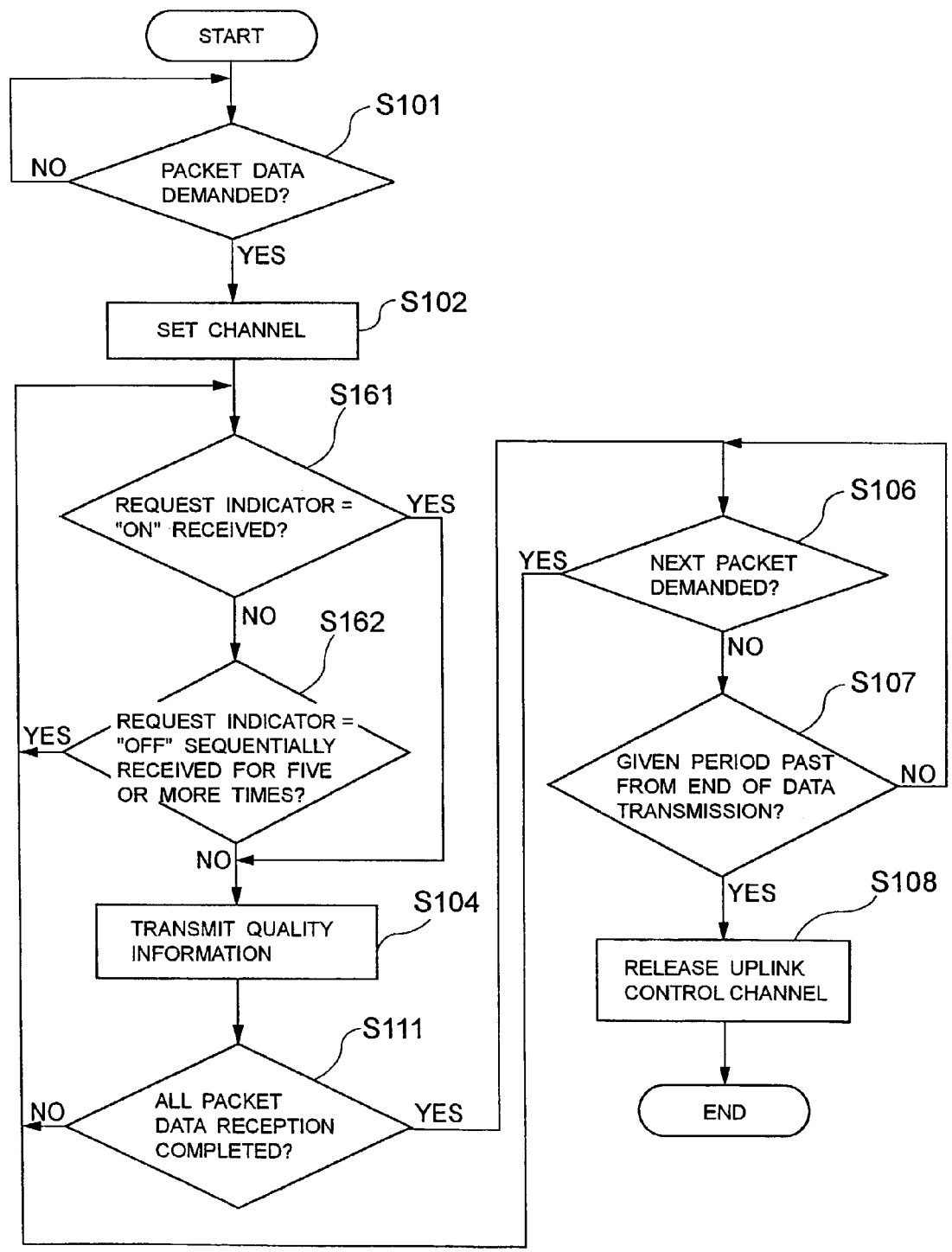
FIG. 26 is a flowchart showing operation of the seventh embodiment of a mobile station according to the present invention.

FIGS. 25 and 26 are flowcharts showing operation of the shown embodiment. By an operation shown in FIG. 25, the processing operation of the base station for setting ON and OFF of the Request Indicator can be realized. On the other hand, by an operation shown in FIG. 26, the processing operation of the mobile station for starting and stopping transmission of the quality information on the basis of the Request Indicator received from the base station can be realized.

Referring to FIG. 25, as initial state, the base station sets the Request Indicator OFF (S11). Next, the base station makes judgment whether the packet data demanded by the mobile station arrives at the own station or not (S12). If the packet data arrived, the packet schedule for transmitting data to the mobile station is checked (S13). On the basis of the result of checking, check is performed whether the packet data is scheduled to transmit to the mobile station within the predetermined period (S14). If the transmission is scheduled, the Request Indicator is set ON (S15). If the transmission is not scheduled, the Request Indicator is set OFF (S16). That is, the Request Indicator is set ON/OFF according to presence or no-presence of the schedule of the transmission. After setting the Request Indicator, judgment is made whether the packet data to be transmitted is the final packet data to be transmitted to the mobile station (S17). If the packet data is the final packet data, the Request Indicator to be transmitted to the mobile station is set OFF (S17). That is, the Request Indicator is set OFF according to the transmission of the final packet data.

FIG. 26 shows a process, in which step S103 of the process shown in the flowchart of the second embodiment shown in FIG. 9 is modified to steps S161 and 162. Namely, after setting the channel (S102), the mobile station makes judgment whether the Request Indicator is received in ON state (S161). If ON, the quality information is transmitted to the base station (S104). If OFF, judgment is made whether Request Indicator in OFF state is sequentially received for five times or more (S162). If less than five times, the quality information is transmitted to the base station (S104).

Figure 27:
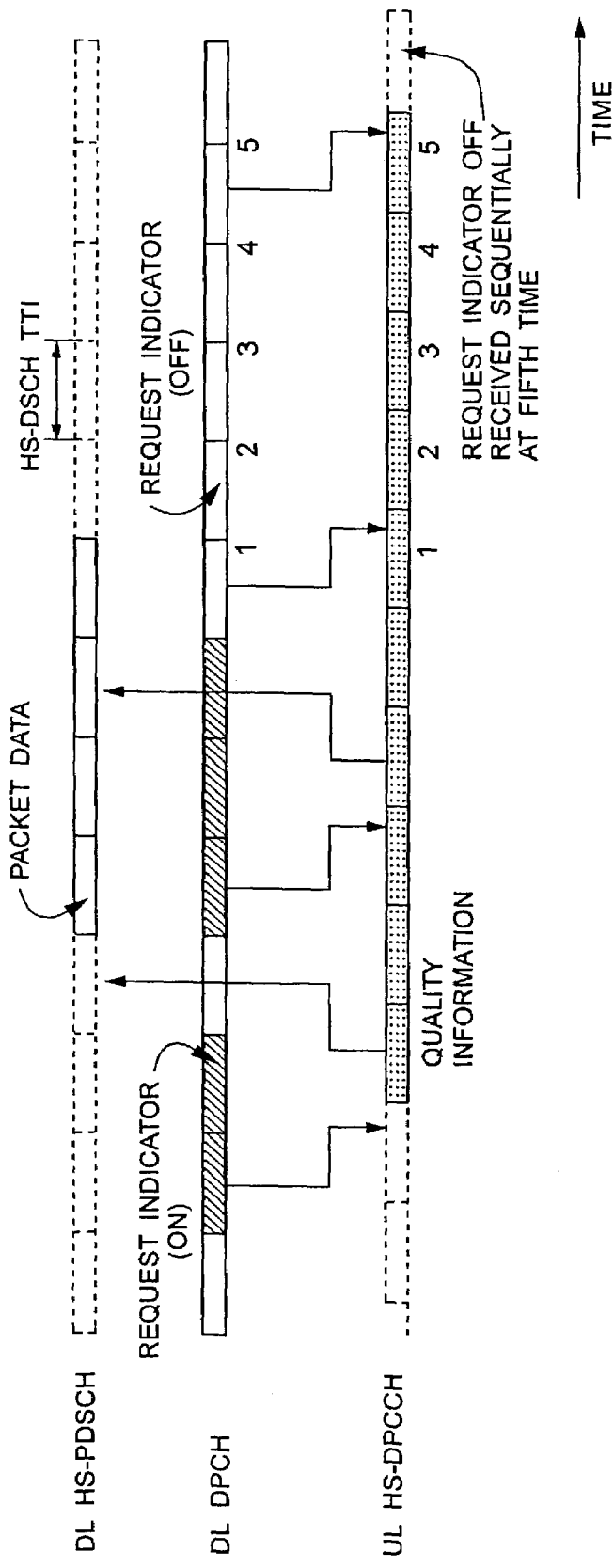
FIG. 27 is an illustration for explaining a principle of the seventh embodiment.
Figure 28:
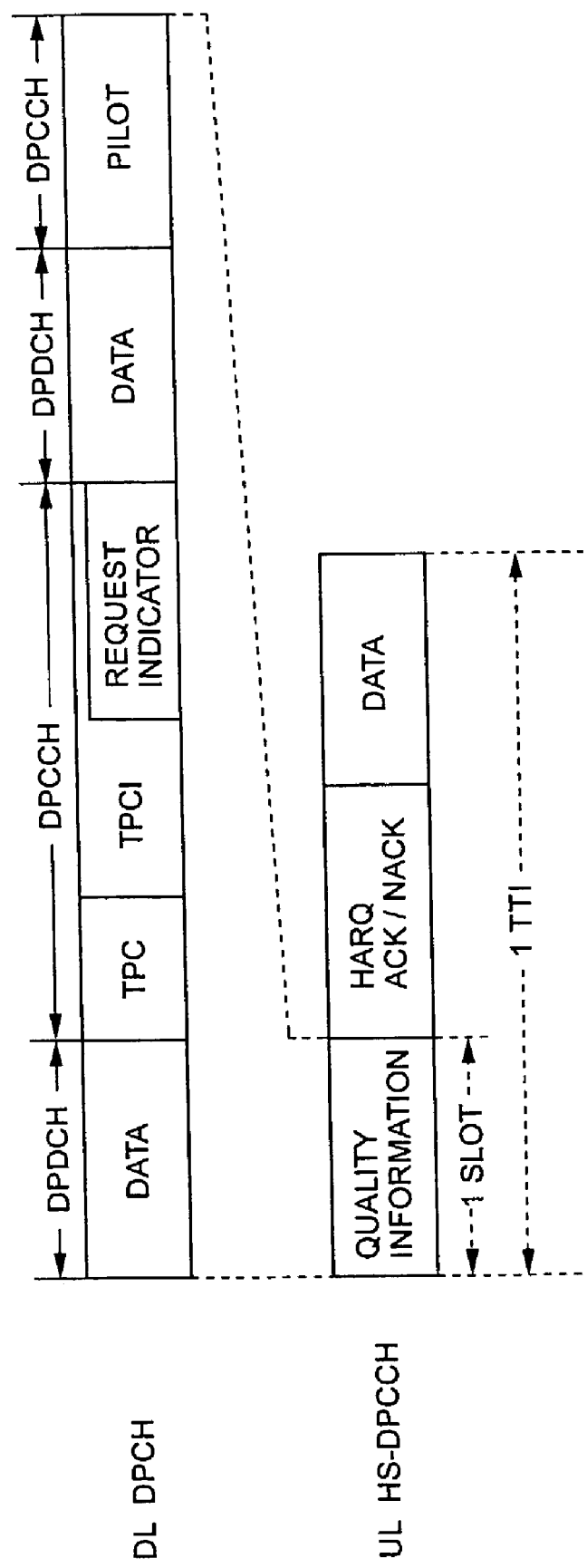
FIG. 28 is an illustration showing examples of respective formats of DL DPCH and UL HS-DPCCH to be used in the seventh embodiment.

FIG. 27 is a conceptual illustration showing a principle of the shown embodiment. FIG. 27 shows the manner for transmitting the quality information to the base station at the predetermined interval when the Request Indicator in ON state is received and the Request Indicator in OFF state is received less than five times. Moreover, when the Request Indicator in OFF state is received for five times or more, manner for stopping transmission of quality information is shown in FIG. 27. FIG. 28 shows respective formats of DL DPCH transmitting the Request Indicator and UL HS-DPCCH transmitting the quality information. In the shown embodiment of the present invention, a part of a region of TFCI is used as a bit for preliminary notice of data transmission. A DL common channel may also be used in replace of DL DPCH. UL HS-DPCCH is the same as the first embodiment shown in FIG. 7.

Next, discussion will be given for the eighth embodiment of the present invention. The shown embodiment transmits the Feedback Indicator simultaneously with transmission of the quality information in the seventh embodiment. In the shown embodiment, the mobile station receives the Request Indicators transmitted by the base station to judge start and stop of transmission of the quality information. Therefore, the mobile station may transmit the quality information only when the base station requires. As the result, battery operation period of the mobile station can be expanded. Furthermore, upon stopping transmission of the quality information, uplink quality control channel is released, only a part of mobile stations among a large number of mobile stations set UL HS-DPCCH to reduce uplink interference power and to increase capacity of the uplink radio channel. Furthermore, since the Feedback Indicator is transmitted upon transmission of the quality information, the base station can certainly receive the quality information. It should be noted that operation of the base station is the same as the process of the preceding seventh embodiment illustrated in the flowchart of FIG. 25.

Figure 29:
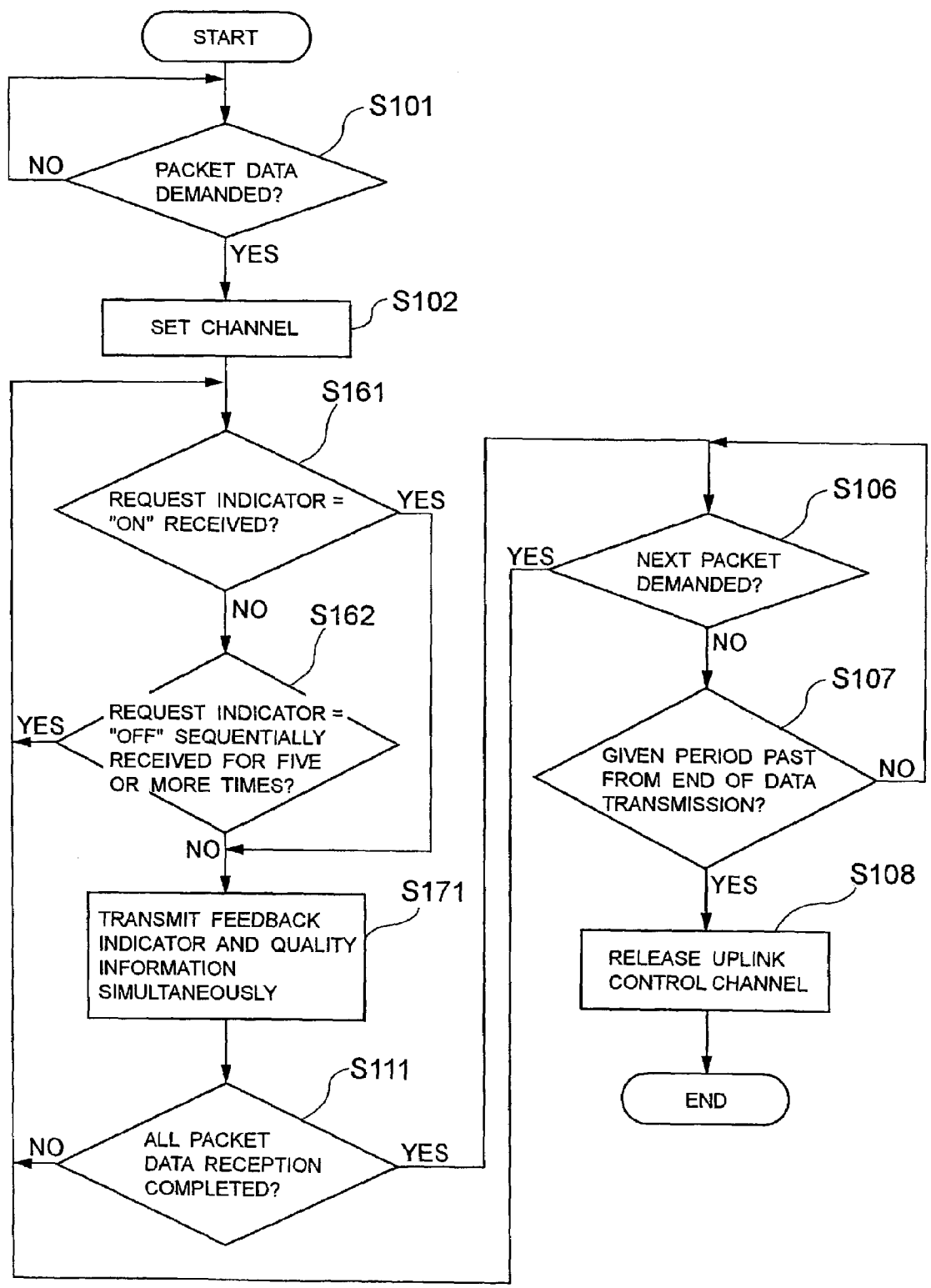
FIG. 29 is a flowchart showing operation of the eighth embodiment of a mobile station according to the present invention.
Figure 30:
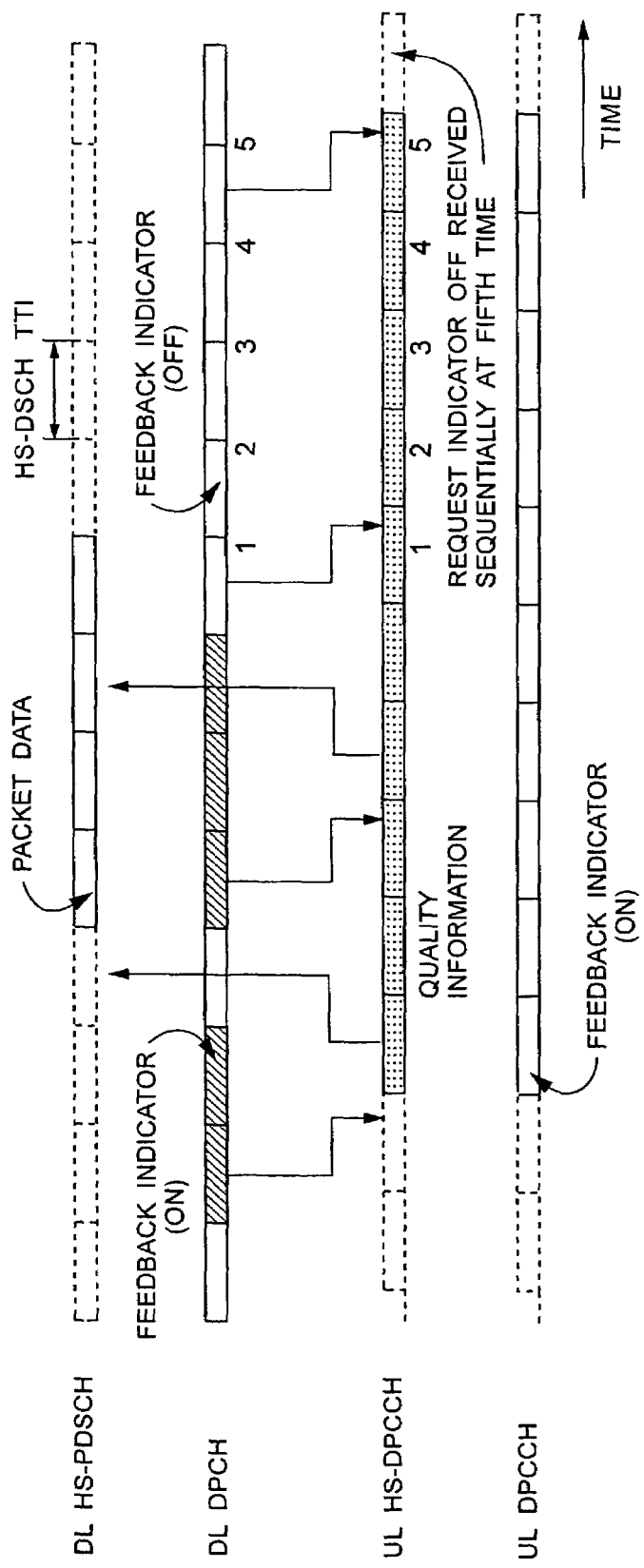
FIG. 30 is an illustration for explaining a principle of the eighth embodiment.

FIG. 29 is a flowchart showing operation of the mobile station of the shown embodiment. The process shown in FIG. 29 modifies the process at step S104 in FIG. 29 to step S171. Namely, the Feedback Indicator and the transmission quality information are transmitted simultaneously (S171). FIG. 30 is a conceptual illustration showing the principle of the shown embodiment. In FIG. 30, UL DPCCH is added to the timing chart shown in FIG. 27. When the mobile station transmits the quality information, the Feedback Indicator is transmitted simultaneously.

It should be noted that process of flowcharts showing operation of the base station and the mobile station in respective of foregoing embodiments may be preliminarily stored in a storage medium as procedure. Then, the procedure stored in the storage medium may be loaded on a computer for execution.

As set forth above, with the present invention, the following effects can be obtained. The first effect is to expand operation period of the battery for smaller power consumption in the mobile station. The reason is that stop control of transmission of the quality information to the base station is performed in the mobile station, and, in conjunction therewith, measurement of the reception quality of the pilot signal can be stopped.

The second effect is to reduce interference wave power of the uplink (UL) to increase capacity of the uplink radio channel. The reason is that transmission period ratio of UL HS-DPCCH can be reduced significantly.

The third effect is that the base station can receive the quality information from the mobile station at a timing, at which the quality information is needed. The reason is that UL HS-DPCCH is set only as needed to make the mobile station to transmit the quality information.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A mobile communication system comprising:
a base station; and
a mobile station,
said base station transmitting a downlink signal using a downlink shared channel;
said mobile station setting an uplink control channel with said base station in response to verifying a packet data demand having been newly made by the mobile station, measuring a reception quality of said downlink signal, transmitting a quality information depending upon said reception quality using said uplink control channel,
said base station performing transmission control of data to said mobile station using said quality information,
said base station including means for transmitting data transmission notice to said mobile station by setting a downlink control channel with said mobile station, and
said mobile station including means for starting transmission of said quality information to said base station at a given interval in response to said data transmission notice while said uplink control channel is set,
wherein, said mobile station stops transmission of said quality information and releases said uplink control channel upon said data transmission notice no longer being received by said mobile station.

2. A mobile communication system as set forth in claim 1, wherein said mobile station includes means for the stopping transmission of said quality information and the release of said uplink control channel in response to receiving an end of data transmission notice from said base station while said uplink control channel is set.

3. A mobile communication system as set forth in claim 1, wherein said mobile station includes means for stopping transmission of said quality information in response to a completion of data reception indicated by the discontinuation of said reception of data.

4. A mobile communication system as set forth in claim 1, wherein said given interval is variable.

5. A mobile communication system comprising:
a base station; and
a mobile station,
said base station transmitting a downlink signal using a downlink shared channel;
said mobile station setting an uplink control channel with said base station in response to verifying a packet data demand having been made by the mobile station, measuring a reception quality of said downlink signal, transmitting a quality information depending upon said reception quality using said uplink control channel,
said base station performing transmission control of data to said mobile station using said quality information,
said mobile station including means for transmitting said quality information at a given interval in response to a continued reception of data, and means for transmitting an indication information indicating on transmission of said quality information using said uplink control channel,
wherein, said mobile station stops transmission of said quality information and releases said uplink control channel upon a discontinuation of said reception of data.

6. A mobile communication system comprising:
a base station; and
a mobile station,
said base station transmitting a downlink signal using a downlink shared channel;
said mobile station setting an uplink control channel with said base station after making a packet data demand to said base station, measuring a reception quality of said downlink signal, transmitting a quality information depending upon said reception quality using said uplink control channel,
said base station performing transmission control of data to said mobile station using said quality information,
said base station including means for notifying a threshold value to said mobile station by setting downlink control channel, and
said mobile station including means for controlling transmission of said quality information to said base station at a given interval in response to a result of comparison of said threshold value and said reception quality, said quality information being sent from said mobile station to said base station only when said reception quality is at least equal to said threshold value.

7. A mobile communication system comprising:
a base station; and
a mobile station,
said base station transmitting a downlink signal using a downlink shared channel;
said mobile station setting an uplink control channel with said base station after making a packet data demand to said base station, measuring a reception quality of said downlink signal, transmitting a quality information depending upon said reception quality using said uplink control channel, said base station performing transmission control of data to said mobile station using said quality information, said base station including means for setting a downlink control channel with said mobile station and transmitting a quality request indicator command information to said mobile station, the quality request indicator command information being indicative of a demand of reporting of said quality information by said mobile station to said base station in response to data transmission to said mobile station, and said mobile station including means for transmitting said quality information to said base station in response to said quality request indicator command information.

8. A mobile communication system as set forth in claim 7, wherein said base station includes means for transmitting, to said mobile station, a quality report stop command information indicative of a demand for stopping reporting of said quality information by said mobile station in response to data transmission to said mobile station, and said mobile station includes means for stopping transmission of said quality information to said base station in response to receiving said quality report stop command information.

9. A communication control method in a mobile communication system including a base station and a mobile station, said base station transmitting a downlink signal using a downlink shared channel, said mobile station setting an uplink control channel with said base station after making a packet data demand to said base station, measuring a reception quality of said downlink signal, transmitting a quality information depending upon said reception quality using said uplink control channel, and said base station performing transmission control of data to said mobile station using said quality information, said communication control method comprising:

in said base station, a step of transmitting a data transmission notice to said mobile station by setting a downlink control channel with said mobile station, and in said mobile station, a step of starting transmission of said quality information to said base station at a given interval in response to said data transmission notice while said uplink control channel is set, wherein, said mobile state stops transmission of said quality information and releases said uplink control channel responsive to no longer receiving said data transmission notice.

10. A communication control method in a mobile communication system as set forth in claim 9, which further comprises, in said mobile station, a step of stopping of transmitting said quality information and releasing said uplink control channel in response to said mobile station receiving an end of data transmission notice from said base station while said uplink control channel is set.

11. A communication control method in a mobile communication system as set forth in claim 9, wherein said given interval is variable.

12. A communication control method in a mobile communication system including a base station and a mobile station, said base station transmitting a downlink signal using a downlink shared channel, said mobile station setting an uplink control channel with said base station upon making a packet data demand to said base station, measuring a reception quality of said downlink signal, transmitting a quality information depending upon said reception quality using said uplink control channel, and said base station performing transmission control of data to said mobile station using said quality information, said communication control method comprising:

in said mobile station, step of transmitting said quality information at a given interval in response to continued reception of data, and step of transmitting an indication information indicating on transmission of said quality information using said uplink control channel, wherein, said mobile station stops transmission of said quality information and releases said uplink control channel upon a discontinuation of said reception of data.

13. A communication control method in a mobile communication system as set forth in claim 12, which further comprises, in said mobile station, a step of stopping transmission of said quality information in response to a completion of data reception indicated by the discontinuation of said reception of data.

14. A communication control method in a mobile communication system including a base station and a mobile station, said base station transmitting a downlink signal using a downlink shared channel, said mobile station setting an uplink control channel with said base station responsive to making a packet data demand to said base station, measuring a reception quality of said downlink signal, transmitting a quality information depending upon said reception quality using said uplink control channel, and said base station performing transmission control of data to said mobile station using said quality information, said communication control method comprising:

in said base station, a step of notifying a threshold value to said mobile station by setting downlink control channel, and in said mobile station, step of controlling transmission of said quality information to said base station at a given interval in response to a result of comparison of said threshold value and said reception quality, said quality information being sent from said mobile station to said base station only when said reception quality is at least equal to said threshold value.

15. A communication control method in a mobile communication system including a base station and a mobile station, said base station transmitting a downlink signal using a downlink shared channel, said mobile station setting an uplink control channel with said base station, measuring a reception quality of said downlink signal, transmitting a quality information depending upon said reception quality using said uplink control channel, and said base station performing transmission control of data to said mobile station using said quality information, said communication control method comprising:

in said base station, a step of setting a downlink control channel with said mobile station and transmitting a quality request indicator command information to said mobile station, the quality request indicator command information being indicative of a demand of reporting of said quality information by said mobile station to said base station in response to data transmission to said mobile station, and in said mobile station, a step of transmitting said quality information to said base station at a given interval in response to said quality request indicator command information.

16. A communication control method in a mobile communication system as set forth in claim 15, which further comprises:
   in said base station, a step of transmitting, to said mobile station, a quality report stop command information indicative of a demand for stopping reporting of said quality information by said mobile station in response to data transmission to said mobile station, and
   in said mobile station, a step of stopping transmission of said quality information to said base station in response to receiving said quality report stop command information.

17. A mobile station in a mobile communication system including a base station and said mobile station,
   said base station transmitting a downlink signal using a downlink shared channel,
   said mobile station setting an uplink control channel with said base station in response to verifying a packet data demand having been newly made by the mobile station, measuring a reception quality of said downlink signal, transmitting a quality information depending upon said reception quality using said uplink control channel,
   said base station performing transmission control of data to said mobile station using said quality information,
   said mobile station comprising:
   means for setting a downlink control channel with said base station and receiving a data transmission notice from said base station; and
   means for starting transmission of said quality information to said base station at a given interval in response to continued reception of said data transmission notice while said uplink control channel is set,
   wherein, said mobile station stops transmission of said quality information and releases said uplink control channel upon said data transmission notice no longer being received by said mobile station.

18. A mobile station in a mobile communication system as set forth in claim 17, which further comprises means for the stopping transmission of said quality information and the release of said uplink control channel in response to receiving an end of data transmission notice from said base station while said uplink control channel is set.

19. A mobile station in a mobile communication system as set forth in claim 17, wherein said given interval is variable.

20. A mobile station in a mobile communication system including a base station and said mobile station,
   said base station transmitting a downlink signal using a downlink shared channel,
   said mobile station setting an uplink control channel with said base station in response to verifying a packet data demand having been made by the mobile station, measuring a reception quality of said downlink signal, transmitting a quality information depending upon said reception quality using said uplink control channel,
   said base station performing transmission control of data to said mobile station using said quality information,
   said mobile station comprising:
   means for transmitting said quality information at a given interval in response to a continued reception of data; and
   means for transmitting an indication information indicating on transmission of said quality information using said uplink control channel,
   wherein, said mobile station stops transmission of said quality information and releases said uplink control channel upon a discontinuation of said reception of data.

21. A mobile station in a mobile communication system as set forth in claim 20, wherein said mobile station includes means for stopping transmission of said quality information in response to a completion of data reception indicated by the discontinuation of said reception of data.

22. A mobile station in a mobile communication system including a base station and said mobile station,
   said base station transmitting a downlink signal using a downlink shared channel,
   said mobile station setting an uplink control channel with said base station after making a packet data demand to said base station, measuring a reception quality of said downlink signal, transmitting a quality information depending upon said reception quality using said uplink control channel,
   said base station performing transmission control of data to said mobile station using said quality information,
   said mobile station comprising:
   means for setting a downlink control channel with said base station and receiving a threshold value from said base station; and
   means for controlling transmission of said quality information to said base station at a given interval in response to a result of comparison of said threshold value and said reception quality, said quality information being sent from said mobile station to said base station only when said reception quality is at least equal to said threshold value.

23. A mobile station in a mobile communication system including a base station and said mobile station,
   said base station transmitting a downlink signal using a downlink shared channel,
   said mobile station setting an uplink control channel with said base station after making a packet data demand to said base station, measuring a reception quality of said downlink signal, transmitting a quality information depending upon said reception quality using said uplink control channel, said base station performing transmission control of data to said mobile station using said quality information,
   said mobile station comprising:
   means for setting a downlink control channel with said base station and receiving a quality request indicator command information to said mobile station, the quality request indicator command information being indicative of a demand of reporting of said quality information by said mobile station to said base station in response to data transmission; and
   means for transmitting said quality information to said base station in response to said quality request indicator command information.

24. A mobile station in a mobile communication system as set forth in claim 23, which further comprises:
   means for receiving a quality report stop command information indicative of a demand for stopping reporting of said quality information from said base station in response to data transmission; and
   means for stopping transmission of said quality information to said base station in response to said received quality report stop command.

25. A base station in a mobile communication system including said base station and a mobile station, said base station transmitting a downlink signal using a downlink shared channel, said mobile station setting an uplink control channel with said base station in response to verifying a packet data demand having been newly made by the mobile station, measuring a reception quality of said downlink signal, transmitting a quality information depending upon said reception quality using said uplink control channel, said base station performing transmission control of data to said mobile station using said quality information, said base station comprising:

means for transmitting data transmission notice to said mobile station by setting a downlink control channel with said mobile station, and means for receiving said quality information from said mobile station transmitting said quality information at a given interval in response to said data transmission notice while said uplink control channel is set and releasing said uplink control channel, upon said mobile station stopping transmission of said quality information and releasing said uplink control channel upon said data transmission notice no longer being sent by said base station to said mobile station.

26. A base station in a mobile communication system as set forth in claim 25, wherein said given interval is variable.

27. A base station in a mobile communication system including said base station and a mobile station, said base station transmitting a downlink signal using a downlink shared channel, said mobile station setting an uplink control channel with said base station in response to verifying a packet data demand having been made by the mobile station, measuring a reception quality of said downlink signal, transmitting a quality information depending upon said reception quality using said uplink control channel, said base station performing transmission control of data to said mobile station using said quality information, said base station comprising:

means for receiving said quality information at a given interval from said mobile station; and means for receiving an indication information indicating on transmission of said quality information from said mobile station using said uplink control channel; and means for releasing said uplink control channel, upon a discontinuation of said transmission of said data to said mobile station and said mobile station responsively stopping transmission of said quality information and releasing said uplink control channel.

28. A base station in a mobile communication system including said base station and a mobile station, said base station transmitting a downlink signal using a downlink shared channel, said mobile station setting an uplink control channel with said base station after making a packet data demand to said base station, measuring a reception quality of said downlink signal, transmitting a quality information depending upon said reception quality using said uplink control channel, said base station performing transmission control of data to said mobile station using said quality information, said base station comprising:

means for notifying a threshold value to said mobile station by setting downlink control channel; and means for receiving said quality information from said mobile station at a given interval in response to a result of comparison of said threshold value and said reception quality, wherein, said quality information is sent from said mobile station to said base station only when said reception quality is at least equal to said threshold value.

29. A base station in a mobile communication system including said base station and a mobile station, said base station transmitting a downlink signal using a downlink shared channel, said mobile station setting an uplink control channel with said base station after making a packet data demand to said base station, measuring a reception quality of said downlink signal, transmitting a quality information depending upon said reception quality using said uplink control channel, said base station performing transmission control of data to said mobile station using said quality information, said base station comprising:

means for setting a downlink control channel with said mobile station and transmitting a quality request indicator command information indicative of a demand of reporting of said quality information by said mobile station to said base station in response to data transmission to said mobile station; and means for receiving said quality information from said mobile station.

30. A base station in a mobile communication system as set forth in claim 29, which further comprises means for transmitting a quality report stop command information indicative of a demand for stopping reporting of said quality information to said mobile station in response to data transmission to said mobile station.

* * * * *